(12) United States Patent
Takahashi et al.

(10) Patent No.: US 9,819,927 B2
(45) Date of Patent: Nov. 14, 2017

(54) IMAGE PROCESSING DEVICE, IMAGE PROCESSING METHOD, AND DEVICE CONTROL SYSTEM

(71) Applicants: Yuji Takahashi, Kanagawa (JP);
Hiroyoshi Sekiguchi, Kanagawa (JP);
Eita Watanabe, Kanagawa (JP);
Yoshikazu Watanabe, Tokyo (JP);
Reiko Kuromizu, Kanagawa (JP)

(72) Inventors: Yuji Takahashi, Kanagawa (JP);
Hiroyoshi Sekiguchi, Kanagawa (JP);
Eita Watanabe, Kanagawa (JP);
Yoshikazu Watanabe, Tokyo (JP);
Reiko Kuromizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 267 days.

(21) Appl. No.: 14/710,787

(22) Filed: May 13, 2015

(65) Prior Publication Data

US 2015/0358610 A1     Dec. 10, 2015

(30) Foreign Application Priority Data

Jun. 9, 2014 (JP) .................................. 2014-118706

(51) Int. Cl.
*H04N 7/18* (2006.01)
*H04N 13/02* (2006.01)
(Continued)

(52) U.S. Cl.
CPC ......... *H04N 13/0239* (2013.01); *G06T 7/593* (2017.01); *G06T 2207/20021* (2013.01);
(Continued)

(58) Field of Classification Search
CPC ....................................................... G06K 9/00
(Continued)

(56) References Cited

U.S. PATENT DOCUMENTS 8,055,017 B2 * 11/2011 Saito .................. G06K 9/00825
348/148
8,570,334 B2 10/2013 Sekiguchi et al.
(Continued)

FOREIGN PATENT DOCUMENTS

JP     2008-039491     2/2008
JP     2013-045276     3/2013

OTHER PUBLICATIONS

Z. Zhang, "A Flexible New Technique for Camera Calibration," Technical Report MSR-TR-98-71, Microsoft Research, Dec. 2, 1998, pp. 1-21.

*Primary Examiner* — Andy Rao
(74) *Attorney, Agent, or Firm* — IPUSA, PLLC

(57) ABSTRACT

Disclosed is an image processing device for generating disparity information from a first image and a second image, wherein the first image is captured by a first capture unit and the second image is captured by a second capture unit. The image processing device includes a disparity detector configured to detect disparity information of a pixel or a pixel block of the second image by correlating the pixel or the pixel block of the second image with each of pixels or each of pixel blocks of the first image within a detection width. The disparity detector is configured to detect the disparity information of the pixel or the pixel block of the second image more than once by changing a start point of pixels or pixel blocks of the first image within the detection width.

10 Claims, 17 Drawing Sheets

(51) Int. Cl.
*G06T 7/593* (2017.01)
*H04N 13/00* (2006.01)

(52) U.S. Cl.
CPC .............. *G06T 2207/30261* (2013.01); *H04N 2013/0081* (2013.01)

(58) Field of Classification Search
USPC .............................. 348/42–60, 110–117, 148
See application file for complete search history.

(56) References Cited

U.S. PATENT DOCUMENTS 8,605,153 B2 12/2013 Sasaki et al.
2014/0347526 A1 11/2014 Hara et al.

* cited by examiner

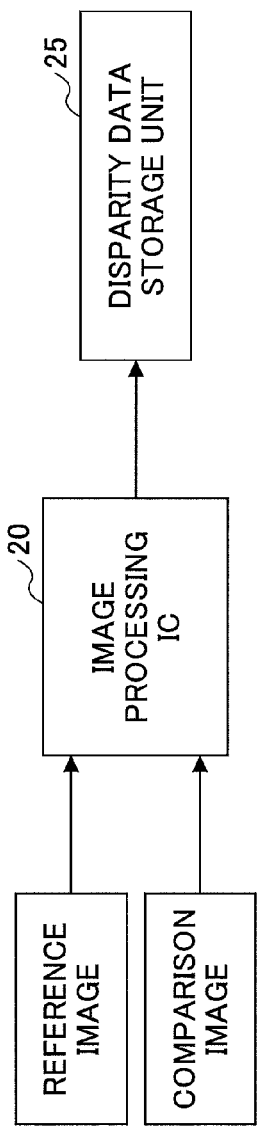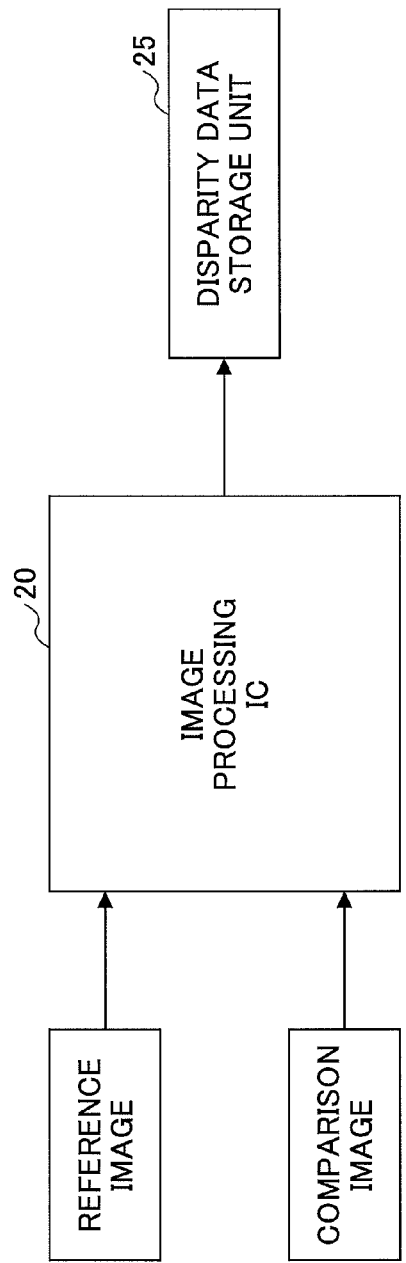

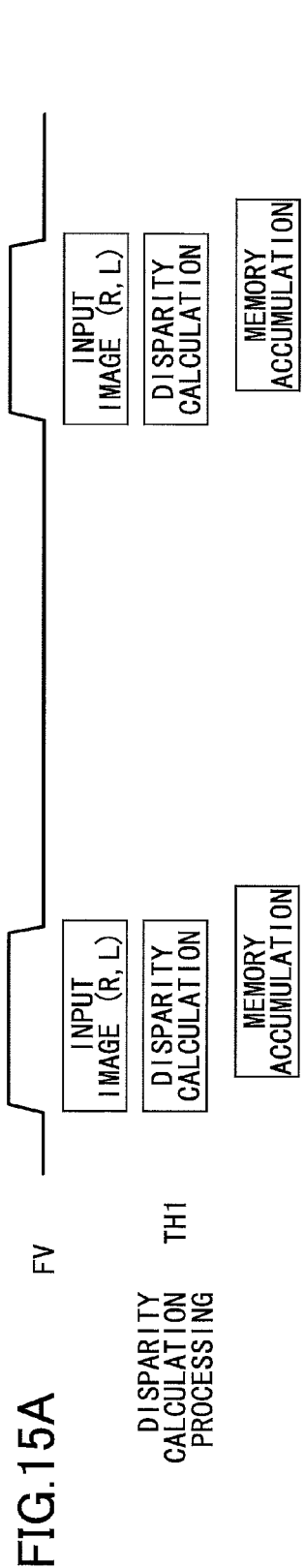
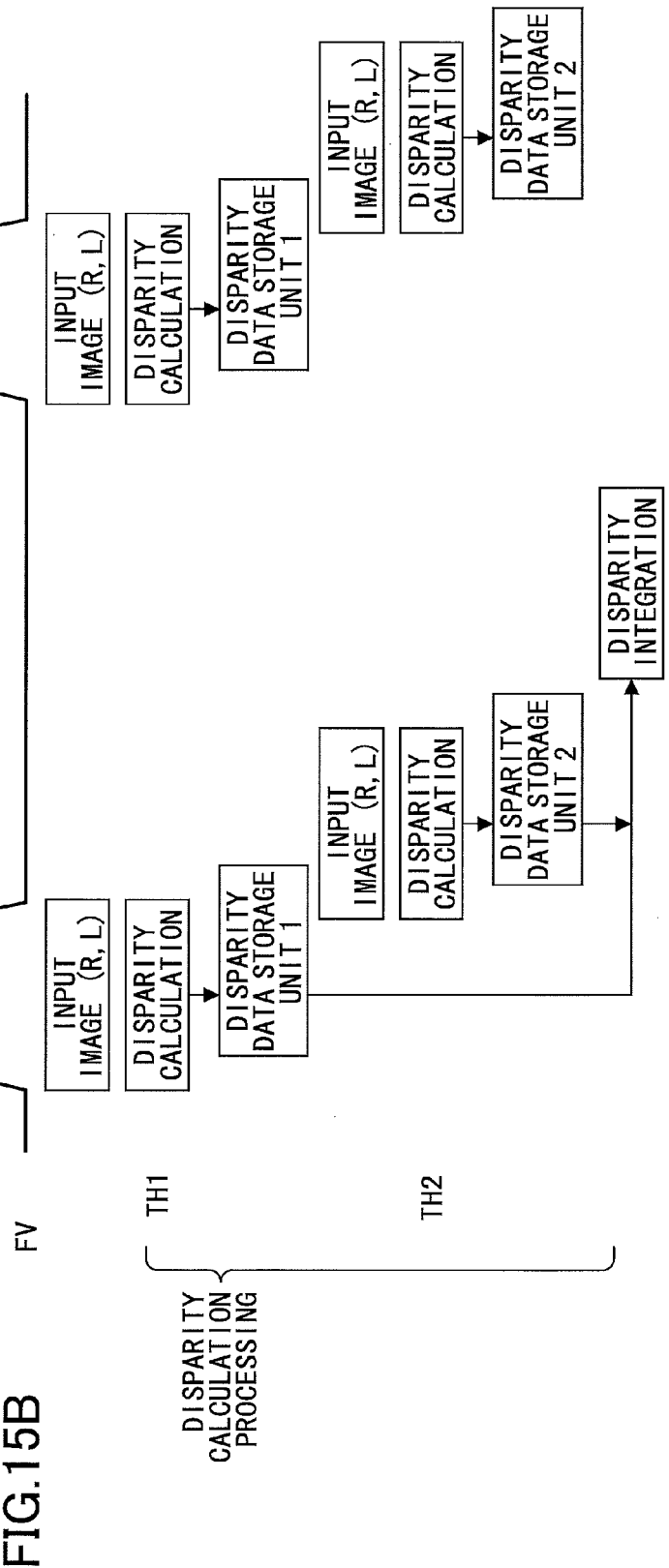

IMAGE PROCESSING DEVICE, IMAGE PROCESSING METHOD, AND DEVICE CONTROL SYSTEM

BACKGROUND OF THE INVENTION

1. Field of the Invention

The present invention relates to an image processing device for generating disparity information from a first image and a second image.

2. Description of the Related Art

A driver assistance system for a vehicle has been known that is for assisting driving when a driver drives a vehicle. The driver assistance system measures a distance between the vehicle and an object (e.g., a pedestrian, another vehicle, or an obstacle). When the driver assistance system finds that there is a high likelihood that the vehicle will collide with the object, the driver assistance system prompts the driver to take avoidance action by outputting an alarm, or causes the vehicle to reduce speed or to stop by activating the brake system.

In the driver assistance system, for example, a stereo camera that is disposed in a front portion of the vehicle may be used for the measurement of the distance. A stereo camera can measure a distance to an object by utilizing the fact that, when the same object is captured from different positions, an image forming position on the captured image varies depending on the distance to the object.

SUMMARY OF THE INVENTION

There is a need for an image processing device that can accurately measure a distance while avoiding increase in size of hardware.

According to an aspect of the present invention, there is provided an image processing device configured to generate disparity information from a first image and a second image, wherein the first image is captured by a first capture unit and the second image is captured by a second capture unit. The image processing device includes a disparity detector configured to detect disparity information of a pixel or a pixel block of the second image by correlating the pixel or the pixel block of the second image with each of pixels or each of pixel blocks of the first image within a detection width, wherein the disparity detector is configured to detect the disparity information of the pixel or the pixel block of the second image more than once by changing a start point of pixels or pixel blocks of the first image within the detection width.

According to another aspect of the present invention, there is provided an image processing method for generating disparity information from a first image and a second image, wherein the first image is captured by a first capture unit and the second image is captured by a second capture unit. The method includes a first disparity information detecting step, by a disparity detector, of detecting disparity information of a pixel or a pixel block of the second image by correlating the pixel or the pixel block of the second image with each of pixels or each of pixel blocks of the first image within a detection width; and a second disparity information detecting step, by the disparity detector, of detecting the disparity information of the pixel or the pixel block of the second image by changing a start point of pixels or pixel blocks of the first image within the detection width.

According to another aspect of the present invention, there is provided a non-transitory computer readable medium storing a program that causes an information processing device configured to generate disparity information from a first image and a second image, wherein the first image is captured by a first capture unit and the second image is captured by a second capture unit, to execute: a first disparity information detecting step of detecting disparity information of a pixel or a pixel block of the second image by correlating the pixel or the pixel block of the second image with each of pixels or each of pixel blocks of the first image within a detection width; and a second disparity information detecting step of detecting the disparity information of the pixel or the pixel block of the second image by changing a start point of pixels or pixel blocks of the first image within the detection width.

According to another aspect of the present invention, there is provided a disparity data producing method for producing disparity information from a first image and a second image, wherein the first image is captured by a first capture unit and the second image is captured by a second capture unit. The method includes a first disparity information detecting step, by a disparity detector, of detecting disparity information of a pixel or a pixel block of the second image by correlating the pixel or the pixel block of the second image with each of pixels or each of pixel blocks of the first image within a detection width; and a second disparity information detecting step, by the disparity detector, of detecting the disparity information of the pixel or the pixel block of the second image by changing a start point of pixels or pixel blocks of the first image within the detection width.

According to another aspect of the present invention, there is provided a device control system configured to control a device by processing an image that is captured by a capture unit. The system includes a first capture unit configured to capture a first image; a second capture unit configured to capture a second image; a disparity detector configured to detect disparity information of a pixel or a pixel block of the second image by correlating the pixel or the pixel block of the second image with each of pixels or each of pixel blocks of the first image within a detection width; and a device controller configured to control the device based on the disparity information that is detected by the disparity detector. The disparity detector is configured to detect the disparity information of the pixel or the pixel block of the second image more than once by changing a start point of pixels or pixel blocks of the first image within the detection width.

According to an embodiment of the present invention, an image processing device can be provided that can accurately measure a distance while avoiding increase in size of hardware.

Other objects, features and advantages of the present invention will become more apparent from the following detailed description when read in conjunction with the accompanying drawings.

BRIEF DESCRIPTION OF THE DRAWINGS

FIGS. 2A and 2B are diagrams illustrating an increase in size of a hardware circuit for calculating a disparity d;

FIGS. 15A and 15B are timing charts of an example of calculation of the disparity d;

DETAILED DESCRIPTION OF THE PREFERRED EMBODIMENTS

Figure 1:
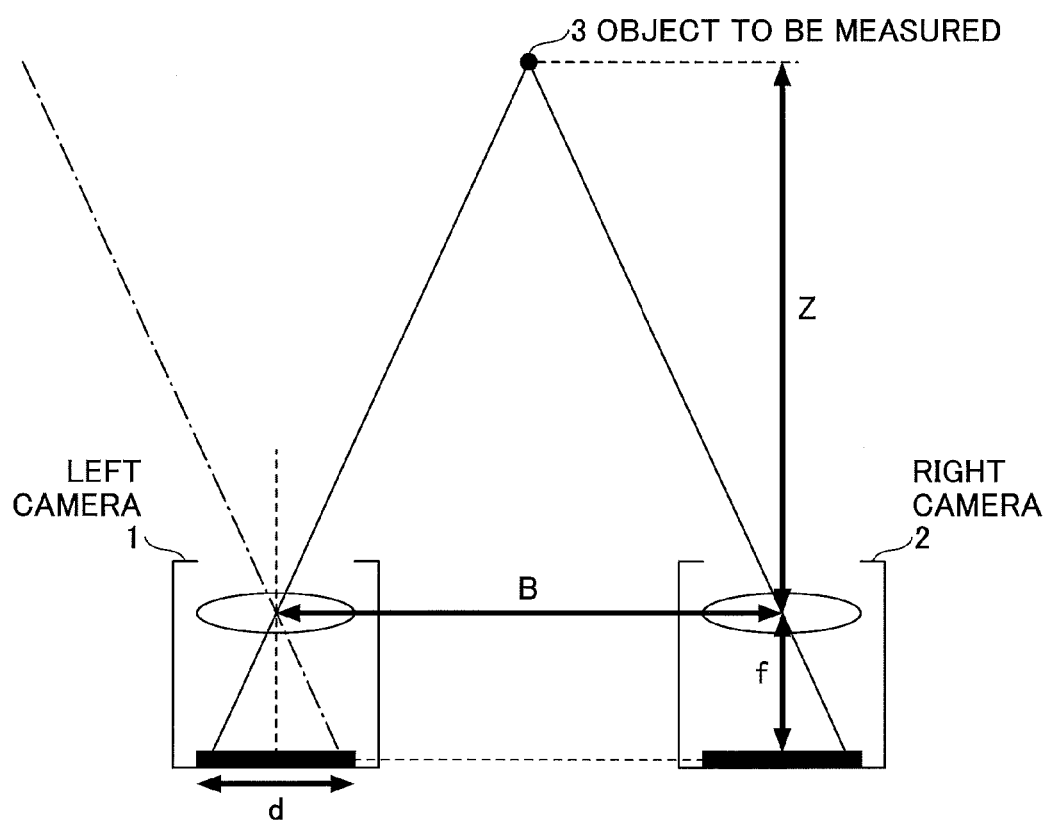
FIG. 1 is an example of a diagram illustrating a ranging principle of a stereo camera.

FIG. 1 is an example illustrating a ranging principle of a stereo camera. By using a base line length B (i.e., a distance between a left camera and a right camera), a focal length f, and a disparity d (a difference between image forming points of an object depending on points of sight), a distance Z from an imaging surface to the object can be represented by the following formula:

$$Z = B \cdot f / d \quad \text{(expression 1)}$$

Thus, the distance Z can be calculated, provided that the disparity d is obtained. For determination of the disparity d, block matching is utilized in many cases. In the block matching, correlation values between small areas of images that are obtained from the left camera and the right camera are calculated while shifting the small areas in the horizontal direction, and a shift amount with which the largest correlation is obtained is determined as the disparity d. For evaluation of the correlation, in many cases, a sum of absolute difference (SAD) or a sum of squared difference (SSD) is used. Here, the sum of absolute difference (SAD) is the sum of the absolute values of differences between pixel values of the two small areas. The sum of squared difference (SSD) is the sum of the squared differences between pixel values of the two small areas.

Calculation of the correlation values is executed by shifting the images by one pixel each time. The maximum value of the shift amount (which is referred to as "detection width") is determined in advance. A greater disparity d can be determined, as the detection width becomes greater. Thus, the detection width may affect measurement accuracy.

For example, comparing the cases in which the disparity d=5 (mm) and the disparity d=10 (mm) for a case of B=1000 (mm) and f=10 (mm), the distances Z are as follows:
when d=5, Z=1000×10/5=2000 (mm), and
when d=10, Z=1000×10/10=1000 (mm).

Thus, when the disparity d=5 (mm), a distance that is greater than or equal to 2 (m) can be measured. When the disparity d=10 (mm), a distance that is greater than or equal to 1 (m) can be measured.

However, as the detection width becomes greater, the number of times of the block matching may increase and an amount of calculation may increase. A large hardware circuit may be required in such a case. FIGS. 2A and 2B are examples of diagrams illustrating an increase in size of the hardware circuit for calculating the disparity d. In FIG. 2A an image processing IC 20 may correspond to the hardware circuit. The image processing IC 20 may calculate the disparity d by obtaining a reference image and a comparison image, and the image processing IC 20 may store the obtained disparity data in a disparity data storage unit 25. The memory capacity of the disparity data storage unit 25 is the same in size as an area of overlap between the reference image and the comparison image for which the disparity can be obtained.

For the image processing IC 20 to calculate the disparity d with the detection width W, it suffices that the image processing IC 20 to have an adder for calculating a correlation value for the detection width W, a shift circuit for executing arithmetic operations, a comparator circuit, and wire connections for connecting these components.

In contrast, when the detection width W is enlarged so that the measurement can be made for a distance that is a half of the shortest measurable distance, the required detection width becomes W×2, as shown in the above-described calculation example. As shown in FIG. 2B, when the detection width doubles, the size of the hardware circuit that is required for the image processing IC 20 doubles. Thus, a limit may be provided for the detection width. However, the limit can be a constraint on the measurable distance or the accuracy.

A technique has been proposed that is for accurately measuring a distance in the vicinity while suppressing the increase in the amount of calculation (cf. Patent Document 1 (Japanese Unexamined Patent Publication No. 2008-039491), for example). Patent Document 1 discloses a stereo image processing device that is for equivalently doubling the detection width by reducing the size of an image that includes an image of an object in the vicinity to one-half in both the vertical direction and horizontal direction and making the detection width for the disparity to be the detection width W that is the same as the detection width for the normal image.

However, in the calculation method that is disclosed in Patent Document 1, the disparity is detected with the detection width W even in a state in which the size of the image is not reduced. Thus, when the search of the disparity is considered that is the search after the size of the image is reduced, the size of the hardware circuit may still be increased. In addition, in the calculation method that is disclosed in Patent Document 1, the accuracy of a short-range disparity may be decreased because the size of the image is reduced.

Figure 3:
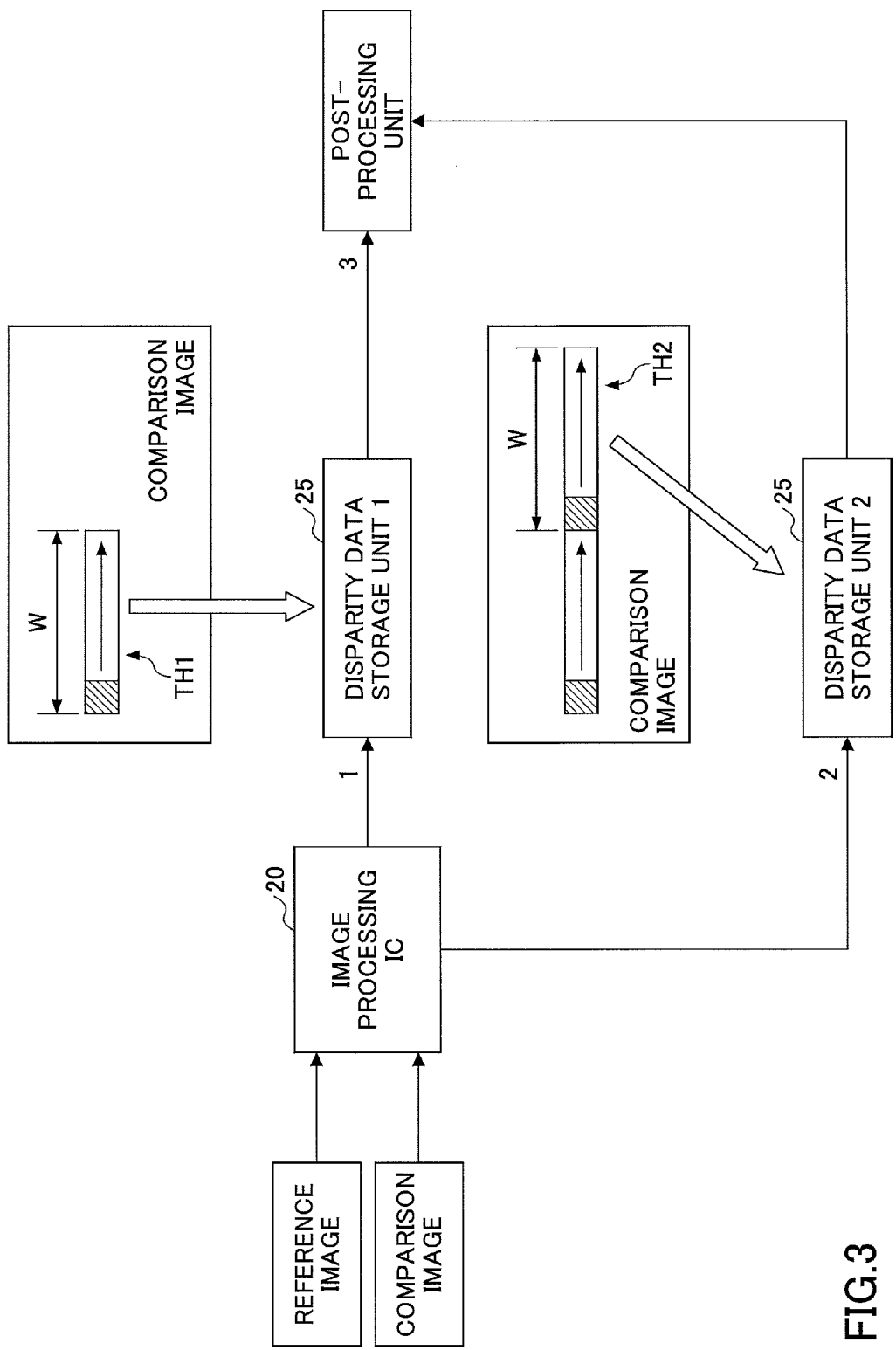
FIG. 3 is a diagram illustrating an example of overall operation of a stereo camera system according to an embodiment.

Hereinafter, an embodiment for implementing the present invention is explained by referring to the accompanying drawings. FIG. 3 is a diagram illustrating an example of overall operation of a stereo camera system, according to the embodiment. One of features of the stereo camera system according to the embodiment is that an image processing integrated circuit (IC) 20 may execute calculation of a disparity d for one pair of image data (i.e., one pixel of interest) more than once.

Here, it is assumed that a detection range of related art is a first detection range TH1, and that a detection range that is extended in the embodiment is a second detection range TH2. The first detection range TH1 is a range having a width W starting from the pixel of interest. The second detection range TH2 is a range having a detection width W starting from a pixel that is next to the pixel of interest+W. Note that the detection widths are W, that is, the detection widths are the same.

1. When a reference image and a comparison image are captured, the image processing IC 20 scans, for each pixel of interest, detection blocks of the comparison image within the first detection range TH1, calculates correlation values between a block of the reference image and the blocks of the comparison image, and stores a value of a disparity d in a disparity data storage unit 1. Consequently, in the disparity data storage unit 1, values of the disparity d can be stored for all pixels in an area of overlap within which the reference image overlaps with the comparison image (which is simply referred to as the "number of pixels of the reference image," hereinafter) and a value of the disparity can be obtained.

2. Subsequently, the image processing IC 20 scans, for each pixel of interest, the detection blocks of the comparison image within the second detection range TH2, calculates correlation values between a block of the reference image and the blocks of the comparison image, and stores a value of a disparity d in a disparity data storage unit 2, until the next reference image and comparison image are captured. Thus, in the disparity data storage unit 2, values of the disparity d that are at the short distance side relative to the first detection range TH1 can be stored for all the pixels of the reference image.

3. For example, a post processing unit (e.g., a CPU that is described below) executes integration processing of the disparity d because two disparities d are calculated for the single pixel of interest. The post processing unit determines, for each pixel, one of the disparities that has the higher reliability as an ultimate disparity d, for example.

Therefore, with the stereo camera according to the embodiment, the detection range can be extended to the short distance side without enlarging the size of the hardware circuit by calculating the disparity d more than once (twice in FIG. 3) for the same reference image and comparison image by the image processing IC 20.

CONFIGURATION EXAMPLE

Figure 4:
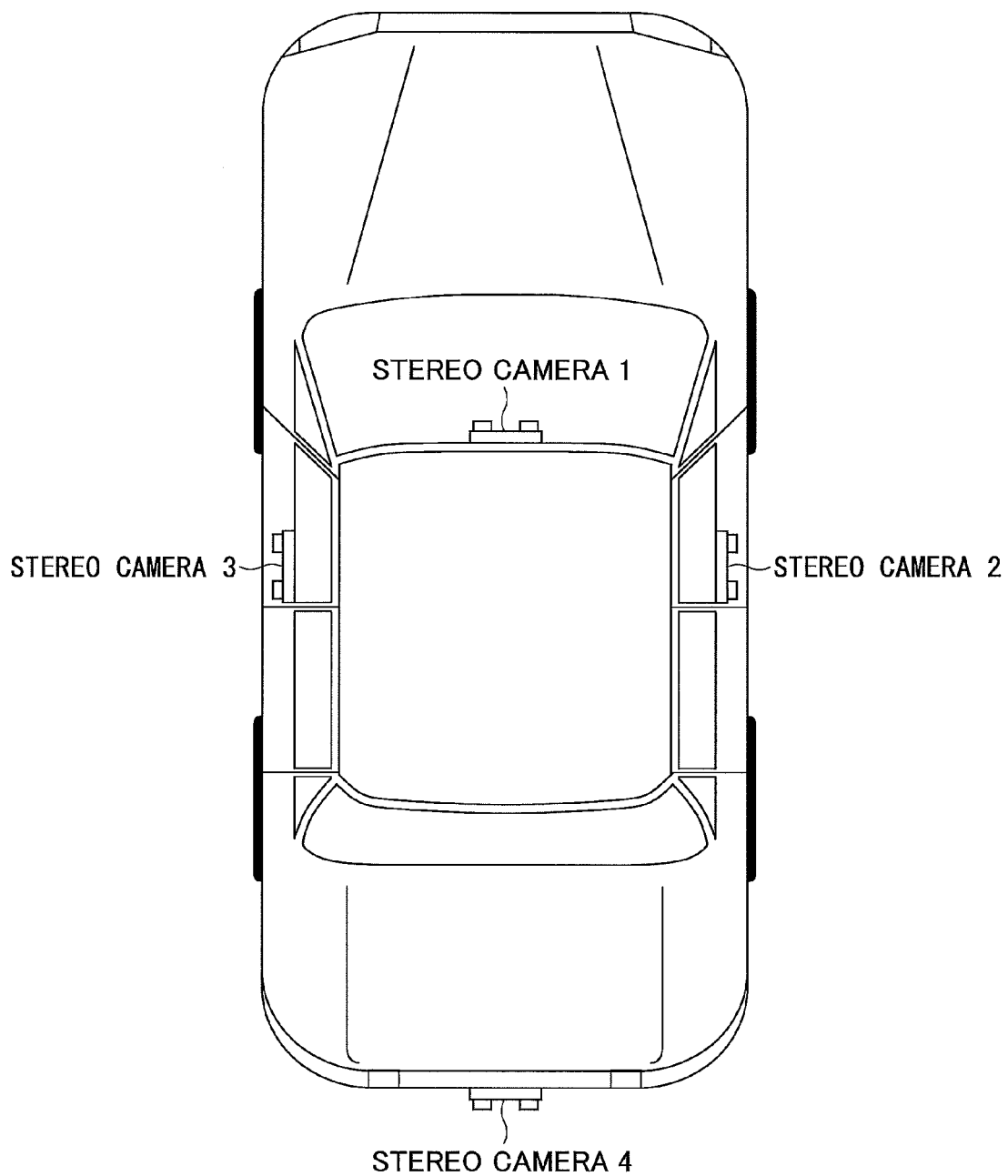
FIG. 4 is a diagram schematically illustrating an example of installation positions of four stereo cameras 1-4.

FIG. 4 is a diagram schematically illustrating an example of installation positions of four stereo cameras 1-4. The stereo camera 1 is disposed in a front portion of the vehicle. The stereo camera 2 is disposed in a right portion of the vehicle. The stereo camera 3 is disposed in a left portion of the vehicle. The stereo camera 4 is disposed in a rear portion of the vehicle. The stereo camera 1 is disposed at a position in the vicinity of an interior rearview mirror, or at a front bumper of the vehicle, for example. The stereo camera 1 is installed such that an optical axis of the stereo camera 1 is directed to the front side of the vehicle, and that the direction of the optical axis is slightly downward relative to the horizontal direction. The stereo camera 2 is disposed at a right wing mirror, a recess of a right side of the vehicle at a position at which a doorhandle is disposed, a frame of a side windshield, an A-pillar, a B-pillar, or a C-pillar, for example. The stereo camera 2 is installed such that an optical axis of the stereo camera 2 is directed to the right side of the vehicle, a slightly rear side relative to the right side of the vehicle, or a slightly front side relative to the right side of the vehicle.

The stereo camera 3 is disposed at a left wing mirror, a recess of a left side of the vehicle at a position at which a doorhandle is disposed, a frame of a side windshield, an A-pillar, a B-pillar, or a C-pillar, for example. The stereo camera 3 is installed such that an optical axis of the stereo camera 3 is directed to the left side of the vehicle, a slightly rear side relative to the left side of the vehicle, or a slightly front side relative to the left side of the vehicle. The stereo camera 4 is disposed at a position in the vicinity of a rear license plate, or at a rear bumper of the vehicle.

The stereo camera 1 is mainly used to measure a distance between the vehicle and a pedestrian in front of the vehicle, a distance between the vehicle and another vehicle in front of the vehicle, and/or a distance between the vehicle and a ground object (e.g., a traffic sign, a traffic light, a utility pole, or a guardrail) or an obstacle. Depending on the distance between the vehicle and an obstacle, the stereo camera system may warn a driver, or the stereo camera system may activate the brake system to apply brakes.

The stereo cameras 2 and 3 are used for detecting, when a driver or a passenger opens or closes a door, a distance between the vehicle and a person or an object approaching the vehicle in the vicinity. The stereo cameras 2 and 3 can be used for detecting a distance between the vehicle and another vehicle in the vicinity in a parking lot, for example. The stereo cameras 2 and 3 can also be used for measuring, when the vehicle is parked, a distance between the vehicle and a bicycle, a motorcycle, and a pedestrian that are approaching to the vehicle from behind, or from right and/or left. Depending on the distance, the stereo camera system may warn a driver, or the stereo camera system may disallow opening of a door.

The stereo camera 4 can be used to detect a distance between the vehicle and an obstacle behind the vehicle. The stereo camera 4 can be used to measure, when the driver or a passenger opens a door, a distance between the vehicle and an obstacle. When an obstacle is located within a predetermined distance from the vehicle, the stereo camera system may disallow opening of a door. When the vehicle is moving backward, depending on a distance between the vehicle and an obstacle, the stereo camera system may warn a driver, or the stereo camera system may activate the break system to apply breaks.

Figure 5:
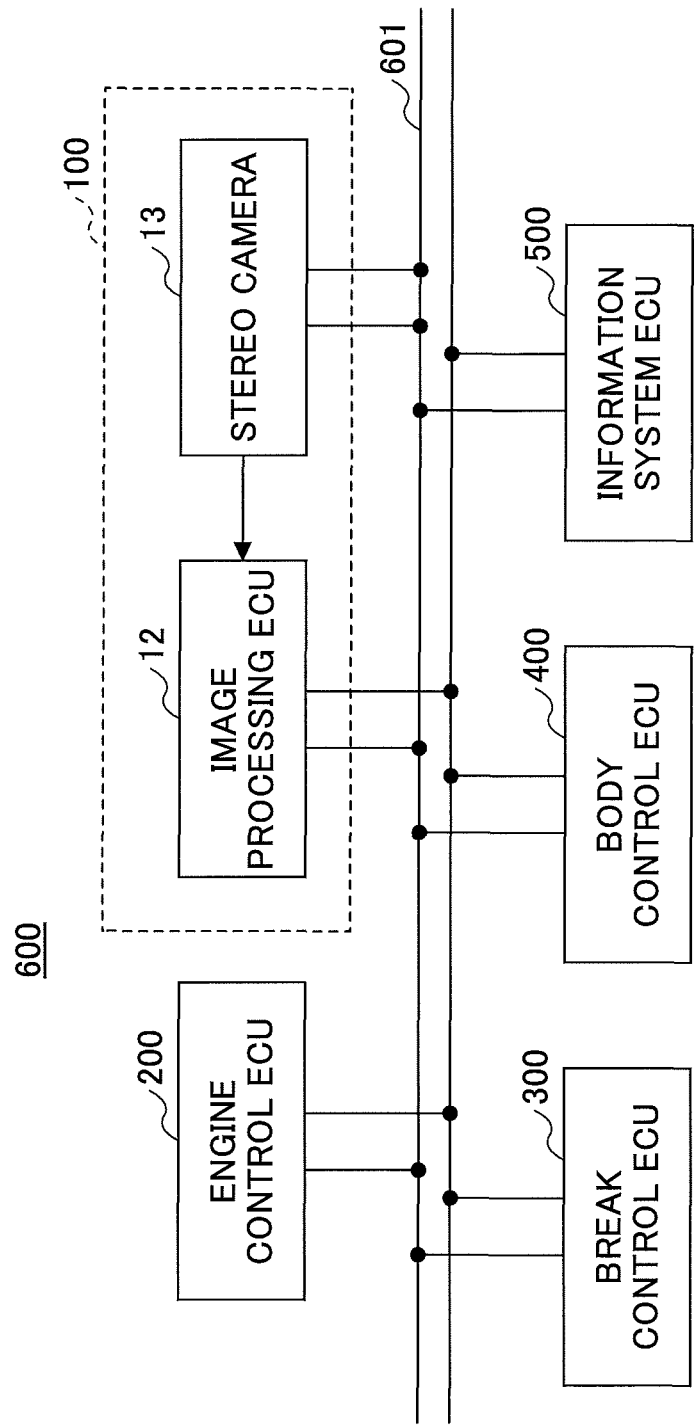
FIG. 5 is a configuration diagram of an example of an automotive system.

FIG. 5 is a configuration diagram of an example of an automotive system 600. The automotive system 600 is an example of a device control system. One vehicle may include many microcomputers. An information processing device that includes one or more microcomputers is often referred to as an "electronic control unit (ECU)." A vehicle may include various types of ECUs. For example, an engine control ECU 200 for controlling an engine, a break control ECU 300 for controlling a break system, a body control ECU 400 for controlling a door or a seat of the vehicle, and an information system ECU 500 for controlling a car navigation system or an audio visual system are known.

In this embodiment, an ECU that obtains distance information from a stereo camera 13 is referred to as an image processing ECU 12. The image processing ECU 12 and the stereo camera 13 can be components of the stereo camera system 100.

Each one of the ECUs is connected to the other ECUs through an on-vehicle LAN 601, so that the ECUs can communicate with each other. The on-vehicle LAN 601 may conform to a standard, such as the Controller Area Network (CAN) standard, the FlexRay standard, the Media Oriented Systems Transport (MOST) standard, the Local Interconnect Network (LIN) standard, or the Ethernet (registered trademark) standard. Data that is stored on the on-vehicle LAN 601 is accessible to all the ECUs that are connected to the on-vehicle LAN 601. With such a configuration, cooperative control among the ECUs can be achieved.

For example, when the image processing ECU 12 calculates a Time To Collision (TTC) based on a distance between the vehicle and an obstacle and speed of the vehicle relative to the obstacle, and when the image processing ECU 12 transmits the calculated TTC to the on-vehicle LAN 601, the break control ECU 300 may control the break system so as to reduce the speed of the vehicle, and the body control ECU 400 may control a seat belt system so that the seat belt is wound up. The ECUs can also control the vehicle so that the vehicle follows another vehicle in front of the vehicle. The ECUs can control the vehicle so that a deviation from a traffic lane is corrected. The ECUs can control steering of the vehicle so as to avoid an obstacle.

Figure 6:
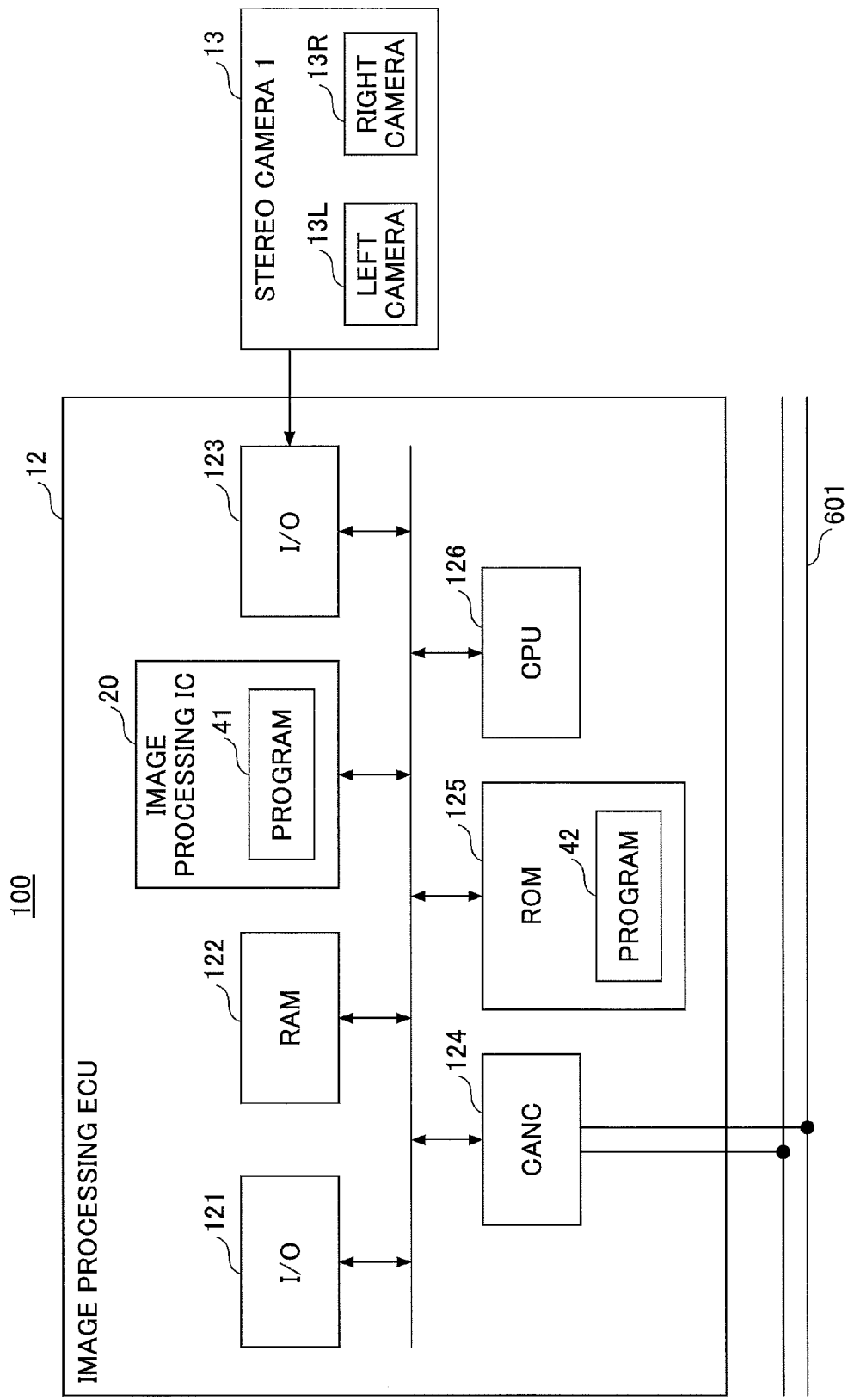
FIG. 6 is a configuration diagram of an example of an image processing electronic control unit (ECU)

FIG. 6 is a configuration diagram of an example of the image processing ECU 12. The image processing ECU 12 can be connected to the stereo camera 13. In FIG. 6, only one stereo camera 13 is shown. However, a plurality of the stereo cameras 13 may connected to the image processing ECU 12. The stereo camera 13 is explained below by referring to FIG. 7.

The image processing ECU 12 includes one or more microcomputers. Similar to a generic microcomputer, the image processing ECU 12 may include a CPU 126, a RAM 122, a ROM 125, a CAN Controller (CANC) 124, an I/O 121 and an I/O 123. Additionally, the image processing ECU 12 may include an image processing IC 20 for processing an image. These components can be connected through a system bus, an external bus, and a bus controller.

The stereo camera 13 can be connected to the I/O 123. Image data of an image that is captured by the stereo camera 13 can be processed by an image processing IC 20, and the image processing IC 20 may calculate a disparity d. The image processing IC 20 can be an electric circuit for implementing a predetermined image processing function, such as a FPGA or an ASIC. Thus, the image processing IC 20 may store a program 41 (or it can be referred to as "firmware").

The CANC 124 can communicate with another ECU based on a CAN protocol. The CPU 126 can execute various types of control. For example, the CPU 126 can execute a program 42 that is stored in the ROM 125 by using the RAM 122 as a work memory, and the CPU 126 can transmit a result of image processing to another ECU through the CANC 124.

Figure 7:
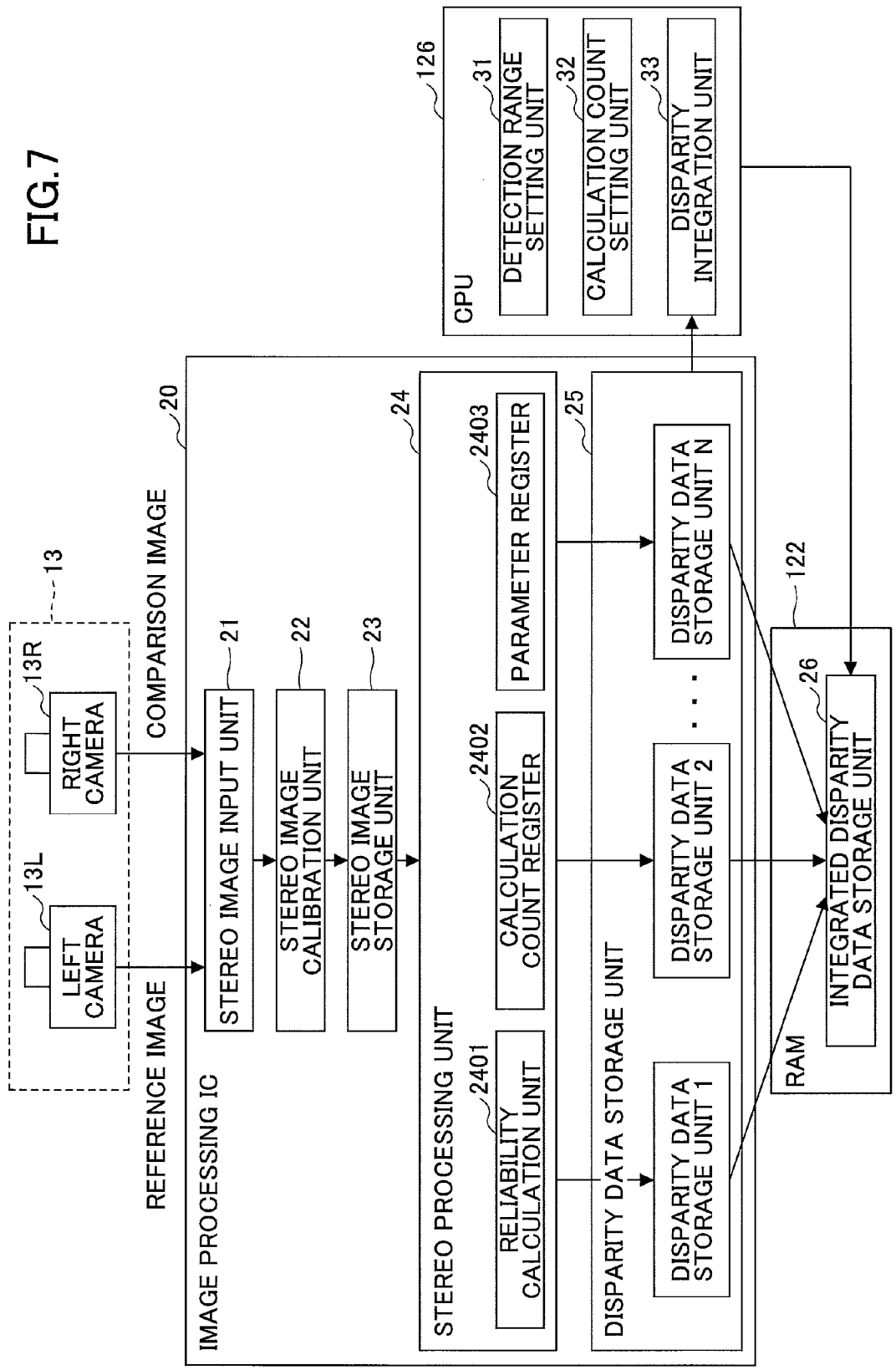
FIG. 7 is a diagram illustrating an example of a basic configuration of an image processing integrated circuit (IC)

FIG. 7 is a diagram illustrating an example of a basic configuration of the image processing IC 20. The stereo camera 13 is connected to the image processing IC 20. The stereo camera 13 can input image data of images to the image processing IC 20. Here, the images may be captured by two monocular cameras of the stereo camera 13 almost simultaneously. The stereo camera 13 includes a left camera 13L and a right camera 13R. The left camera 13L is disposed in a left side relative to the front of the vehicle (i.e., the left side in the traveling direction of the vehicle). The right camera 13R is disposed in a right side relative to the front of the vehicle (i.e., the right side in the traveling direction of the vehicle). The left camera 13L and the right camera 13R are installed such that the left camera 13L and the right camera 13R are spaced by a distance of a base line length B, and that the optical axes of the left camera 13L and the right camera 13R are parallel to each other. In the following explanation, it is assumed that the image data that is captured by the left camera 13L is the reference image, and that the image data that is captured by the right camera 13R is the comparison image. However, in the positional relationship of the above-described assumption, the left camera 13L and the right camera 13R may be reversed.

The left camera 13L and the right camera 13R are CCD cameras such that the exposure time and gain can be varied. The left camera 13L and the right camera 13R are synchronized, and the left camera 13L and the right camera 13R capture images at the same timing. Note that the image sensor is not limited to the CCD. An image sensor, such as a CMOS, may be used.

The image processing IC 20 may include a stereo image input unit 21; a stereo image calibration unit 22; a stereo image storage unit 23; a stereo processing unit 24; and a disparity data storage unit 25.

The stereo image input unit 21 can obtain image data that is captured by the left camera 13L and image data that is captured by the right camera 13R. Specifically, assuming that image data corresponding to a time interval from "ON" of a frame synchronization signal FV to "OFF" of the frame synchronization signal FV is one piece of image data, image data is obtained from the left camera 13L and image data is obtained from the right camera 13R.

The stereo image calibration unit 22 can correct the reference image and the comparison image that are input from the stereo camera 13. Due to a mechanical displacement between a lens optical system and an image sensor and/or distortion aberration that occurs in the lens optical system, the left camera 13L and the right camera 13R may have different camera characteristics, even if the same cameras are used as the left camera 13L and the right camera 13R. Additionally, an installation position of the installed left camera 13L may be shifted relative to an installation position of the installed right camera 13R. The stereo image calibration unit 22 can correct these. Specifically, the stereo image calibration unit 22 may capture, in advance, an image, such as an image of a lattice pattern, and the stereo image calibration unit 22 may execute calibration for obtaining the correspondence between pixel values of the reference image and pixel values of the comparison image. Details of the calibration method are disclosed in Non-Patent Document 1 (Z. Zhang, "A Flexible New Technique for Camera Calibration," Technical Report MSR-TR-98-71, Microsoft Research, 1998), for example. However, the calibration method is not limited to that of Non-Patent Document 1. A result of the calibration is registered in a Look Up Table (LUT), for example. The stereo image calibration unit 22 may change a pixel position of the comparison image by referring to the LUT, for example. By doing this, the reference image and the comparison image can be obtained in which a difference other than the disparity may not occur.

The stereo image storage unit 23 may store the reference image and the comparison image that are corrected by the stereo image calibration unit 22 as original images for a disparity calculation. The pair of the reference image and the comparison image that is stored in the stereo image storage unit 23 can be used multiple times for the calculation of the disparity d.

The stereo processing unit 24 can calculate a disparity d between the reference image and the comparison image by processing the reference image and the comparison image. The disparity d is the disparity information. Specifically, the stereo processing unit 24 may execute, for the reference image and the comparison image that are stored in the stereo image storage unit 23, block matching for detecting the corresponding points by obtaining a correlation value for each small region (block) of the reference image and the comparison image, and the stereo processing unit 24 can calculate a shift between a pixel of the corresponding point of the reference image and a pixel of the corresponding point of the comparison image (the disparity d). This disparity d corresponds to the disparity d in the expression 1. By using the disparity d, the focal length f, and the base line length B, the distance information of the pixel of interest can be obtained. Details of the stereo processing unit 24 are described below.

A reliability calculation unit 2401 of the stereo processing unit 24 can calculate reliability for each disparity d. Thus, the reliability information may be attached to the disparity d.

The stereo processing unit 24 may include a calculation count register 2402 and a parameter register 2403. A calculation count setting unit 32 of the CPU 126 may set the number of times of the calculation of the disparity d in the calculation count register 2402. In this embodiment, the number of times of the calculation of the disparity d is at least one. When the disparity d is calculated for a short distance relative to the distance of the related art without enlarging the size of the hardware circuit, the number of the times of the calculation of the disparity d can be greater than or equal to two. In principle, as the number of times of the calculation of the disparity d, a fixed value (e.g., 2 or 3) may always be set. However, as explained by referring to FIG. 16, the number of times of the calculation of the disparity d may be dynamically changed depending on a condition of the vehicle.

A starting point of a detection width W is set in the parameter register 2403. The stereo processing unit 24 may start the calculation of the disparity d from the starting point. For example, suppose that the detection width W is 32 pixels. In this case, during the calculation of the disparity d for the first time, the value "0" is set in the parameter register 2403. During the calculation of the disparity d for the second time, the value "32" is set in the parameter register 2403. By doing this, for the calculation of the disparity d for the first time, the stereo processing unit 24 can calculate the disparity d by using 32 pixels that are from the zeroth pixel to the 31st pixel as the detection width, while using the pixel of interest as the starting point of the detection width. For the calculation of the disparity d for the second time, the stereo processing unit 24 can calculate the disparity d by using 32 pixels that are from the 32nd pixel to the 63rd pixel as the detection width, while using the pixel next to the 32nd pixel from the pixel of interest as the starting point of the detection width.

Each time the stereo processing unit calculates the disparity d, the starting point in the parameter register 2403 is updated. The CPU 126 may update the starting point in the parameter register 2403.

The disparity data storage unit 25 includes disparity data storage units 1 to N. The stereo processing unit 24 may store a result of the calculation of the disparity d for the first time in the disparity data storage unit 1. The stereo processing unit 24 may store a result of the calculation of the disparity d for the second time in the disparity data storage unit 2. Similarly, the stereo processing unit 24 may store a result of the calculation of the disparity d for the Nth time in the disparity data storage unit N. The disparity data storage unit 25 may be provided in the RAM 122, for example. Here, the RAM 122 may be provided outside the image processing IC 20. Alternatively, the disparity data storage unit 25 may be provided in a storage unit other than the image processing IC 20 and the RAM 122.

Additionally, an integrated disparity data storage unit 26 is provided in the RAM 122. In the integrated disparity data storage unit 26, one disparity d is stored. Here, the one disparity d is obtained by integrating the disparities "d"s that are stored in the disparity data storage units 1 to N, respectively. The integrated disparity data storage unit 26 may be provided in the disparity data storage unit 25.

The stereo camera system 100 may include the calculation count setting unit 32, a detection range setting unit 31, and a disparity integration unit 33. Here, the calculation count setting unit 32, the detection range setting unit 31, and the disparity integration unit 33 can be achieved by executing the program 42 by the CPU 126 and cooperating with the hardware shown in FIG. 6. The disparity integration unit 33 can integrate the disparities "d"s that are stored in the disparity data storage unit 1 to N, respectively. Namely, in the disparity data storage unit 25, for the same pixel of interest, the disparities "d"s are stored, and the number of the "d"s corresponds to the number of times of the calculation. Thus, the disparities "d"s are integrated. Specifically, the reliability that is calculated by the reliability calculation unit 2401 may be used. The disparity integration unit 33 may determine the disparity d having the highest reliability among the disparities "d"s that are stored in the disparity storage units 1 to N to be the ultimate disparity d.

The integrated disparity d may be stored in the integrated disparity data storage unit 26. This disparity d can be used for controlling the vehicle or for recognition processing, for example. When the disparity d is stored in the disparity data storage unit 25, the disparity d may be converted into distance information.

The calculation count setting unit 32 may set a number of times of calculation in the calculation count register 2402. The calculation count setting unit 32 may set a fixed number of times of the calculation during the activation of the stereo camera system 100 in the calculation count register 2402. Alternatively, the calculation count setting unit 32 may dynamically set a number of times of the calculation in the calculation count register 2402 depending on a condition of the vehicle. The detection range setting unit 31 may set the starting point of the detection width W, from which the calculation of the disparity d is started, in the parameter register 2403.

<Details of the Process of the Stereo Processing Unit>

Figure 8:
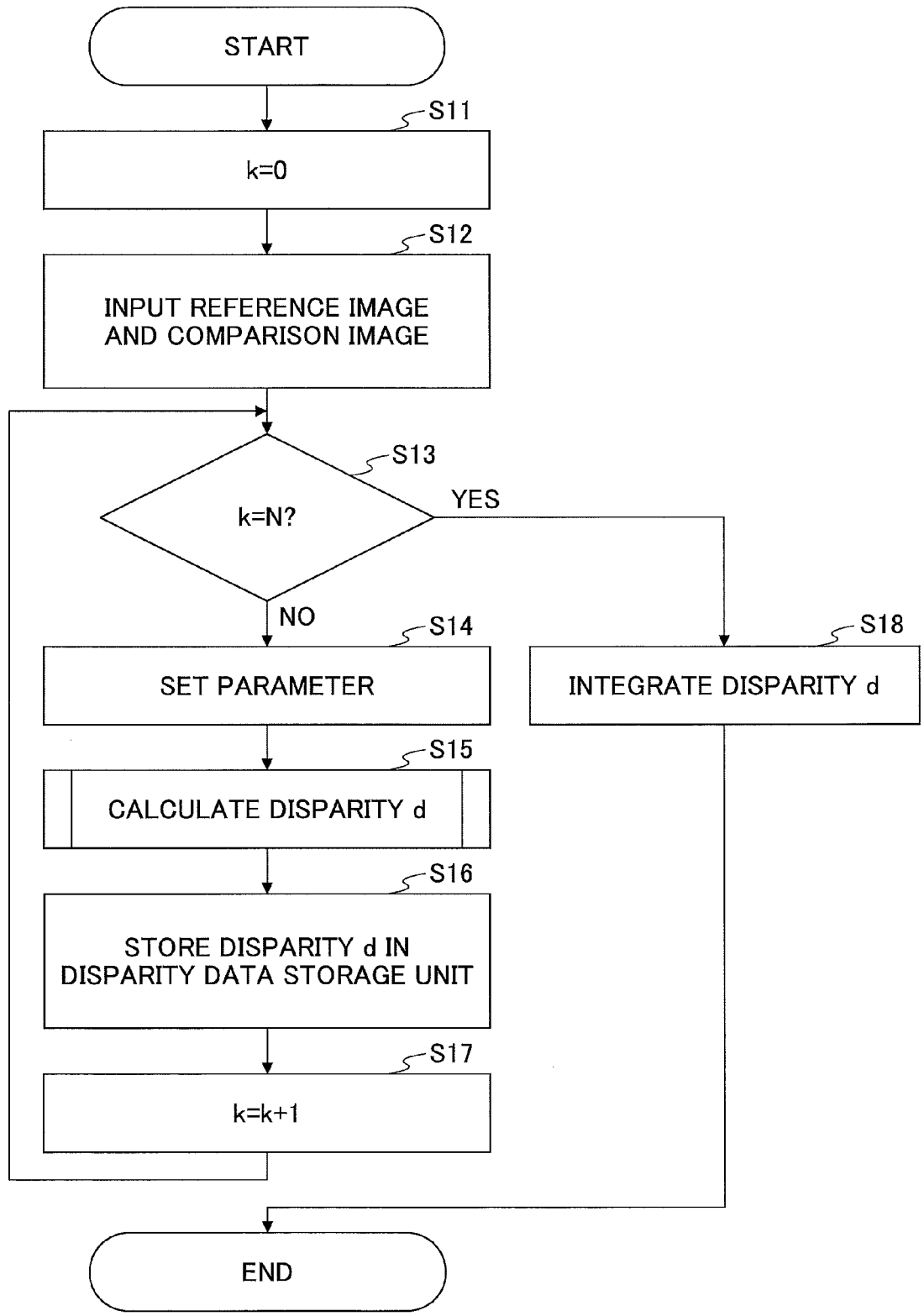
FIG. 8 is a flowchart illustrating an example of an operation procedure of the image processing IC.

FIG. 8 is a flowchart illustrating an example of an operation procedure of the image processing IC 20.

S11: The stereo processing unit 24 executes a process of initializing a variable k to be zero.

S12: The stereo camera 13 captures the reference image and the comparison image, and the stereo image input unit obtains the reference image and the comparison image. The stereo image calibration unit 22 corrects the reference image and the comparison image by using the LUT, for example, and the stereo image calibration unit 22 stores the corrected reference image and comparison image in the stereo image storage unit 23.

S13: The stereo processing unit determines whether the variable k matches the number of times of the calculation N.

S14: When the determination at step S13 is. No, the number of times of the calculation of the disparity d is insufficient. The stereo processing unit 24 sets a parameter in the parameter register 2403. Specifically, depending on the value of the variable k, the stereo processing unit 24 sets the parameter as follows:

for k=0, the parameter=0,
for k=1, the parameter=32,
for k=2, the parameter=64; and
for k=N−1, the parameter=the detection width W×k.

S15: The stereo processing unit 24 calculates the disparity d by applying the block matching to the images on the left and right (i.e., the comparison image and the reference image).

S16: Depending on the number of times of the calculation, the stereo processing unit 24 stores the calculated disparity d in the corresponding one of the disparity data storage unit 1 to N.

S17: The stereo image calculation unit 24 adds one to the value of the variable k.

S18: When the determination at step S13 is Yes, the disparity d is calculated the number of times of the calculation that is stored in the calculation count register 2402. Thus, the stereo processing unit requests the disparity integration unit 33 to integrate the disparity d. In response to the request, the disparity integration unit 33 integrates N pieces of disparities "d"s.

With the above-described processes, the process of calculating the disparity d for the pair of the reference image and the comparison image is completed. The image processing IC 20 repeats the calculation of the disparity d for a reference image and a comparison image that are input.

<<Calculation of the Disparity d>>

Figure 9:
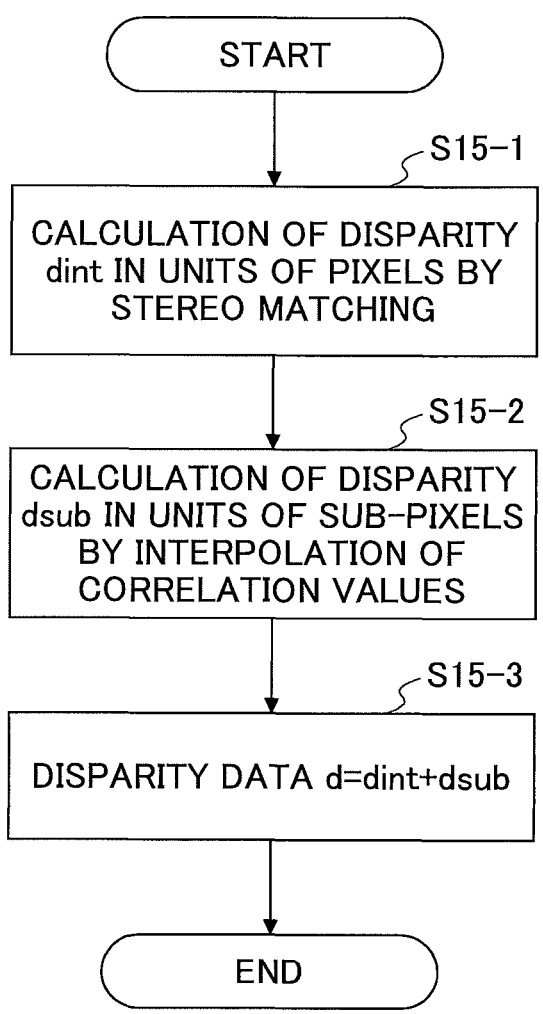
FIG. 9 is a flowchart illustrating an example of a process of step S15 of FIG. 8.

FIG. 9 is a flowchart illustrating an example of a process of step S15 of FIG. 8.

S15-1: The stereo processing unit 24 applies block matching to image data of the left image and image data of the right image (i.e., the comparison image and the reference image), and the stereo processing unit 24 calculates a disparity "dint" in units of pixels.

Figure 10:
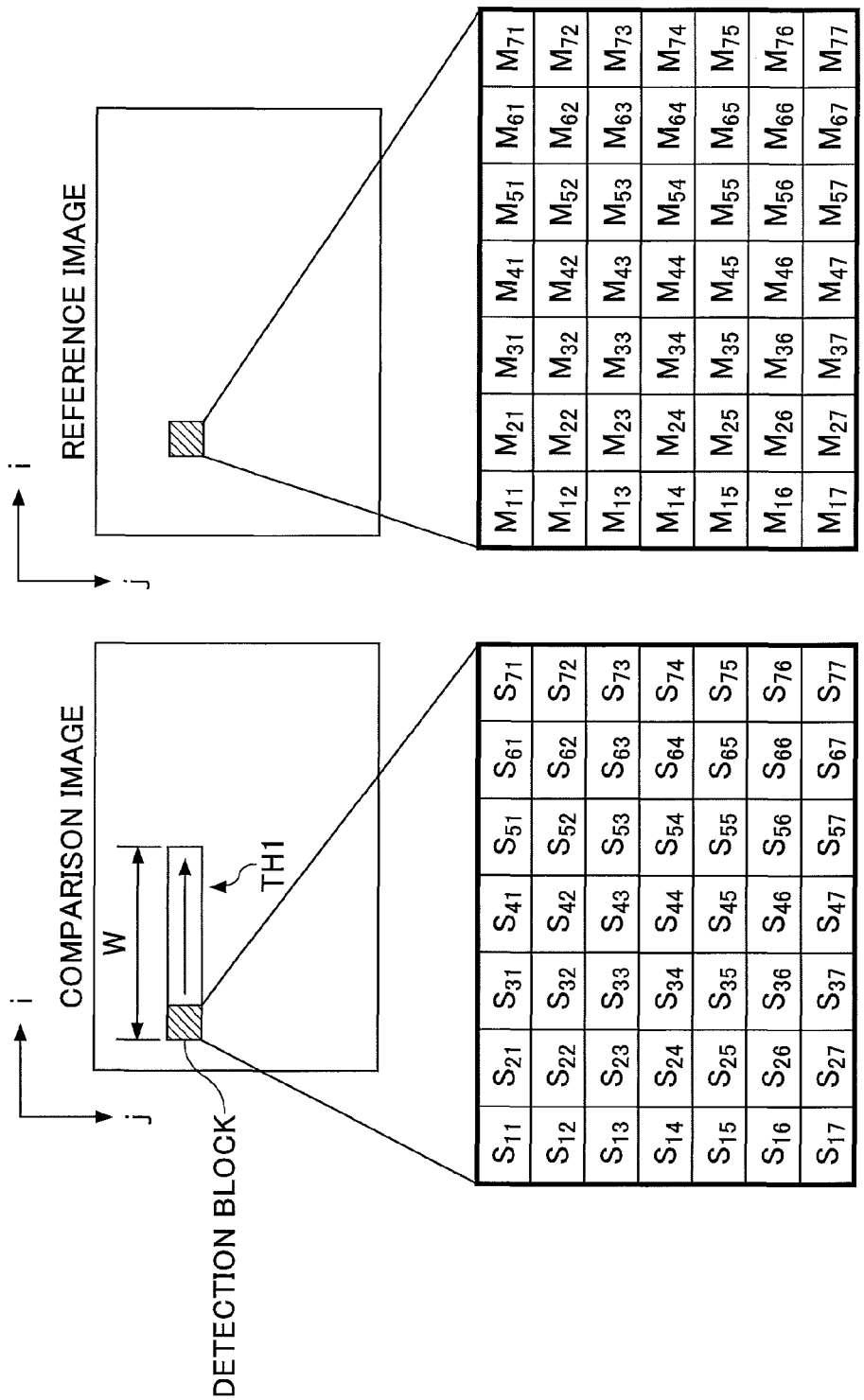
FIG. 10 is a diagram illustrating an example of block matching for calculating a disparity d for a first time.

FIG. 10 is a diagram illustrating an example of block matching for calculating the disparity d for a first time. In the block matching, an input image is divided into detection blocks. Each of the detection blocks is a small area. Then a correlation value between detection blocks of the comparison image and the reference image is calculated each time the detection block of the comparison image is shifted by one pixel in the horizontal direction of the image relative to the detection block of the reference image. That is, correlation values are calculated by shifting the detection block of the comparison image relative to the detection block of the reference image. In this embodiment, it is assumed that:

the size of the detection block: 7×7;

a brightness value of each pixel of the reference image: $M_{i,j}$ (i=1-7, j=1-7); and a brightness value of each pixel of the comparison image: $S_{i,j}$ (i=1-7, j=1-7).

Note that the size of the detection block is for exemplifying purposes only.

In the detection for the first time, the detection is performed in the range from the zeroth pixel to the 31st pixel (i.e., the detection is performed in the range of the first detection range TH1), and the detection is started from the pixel of interest. The first detection range TH1 is a range with the detection width W that starts from the pixel of interest. In the first detection range TH1, a shift amount is determined for which the correlation value becomes the best (in this case, the smallest value). The shift amount that corresponds to the smallest correlation value represents the disparity "dint" in units of pixels.

In this embodiment, a zero-mean sum of squared difference (ZSSD) value is used as a correlation value. However, this ZSSD value is three times as large as a usual ZSSD value. Details of this procedure are explained below by referring to FIGS. 11 and 12.

S15-2: Returning to FIG. 9, the stereo processing unit 24 calculates a disparity. "dsub" in units of sub-pixels by using the correlation value that is calculated at step S15-1.

As examples of the method of calculating the disparity in units of sub-pixels, an isometric linear fitting, a parabola fitting, a higher-order polynomial fitting (4th order), another higher-order polynomial fitting (6th order) and the like are known. In the embodiment, the disparity "dsub" in units of sub-pixels may be calculated by a predefined calculation method or a dynamically switched calculation method, in consideration of the calculation time, for example.

S15-3: The stereo processing unit 24 calculates the disparity d by adding the disparity "dint" in units of pixels and the disparity "dsub" in units of sub-pixels.

<<The Process of S15-1>>

Figure 11:
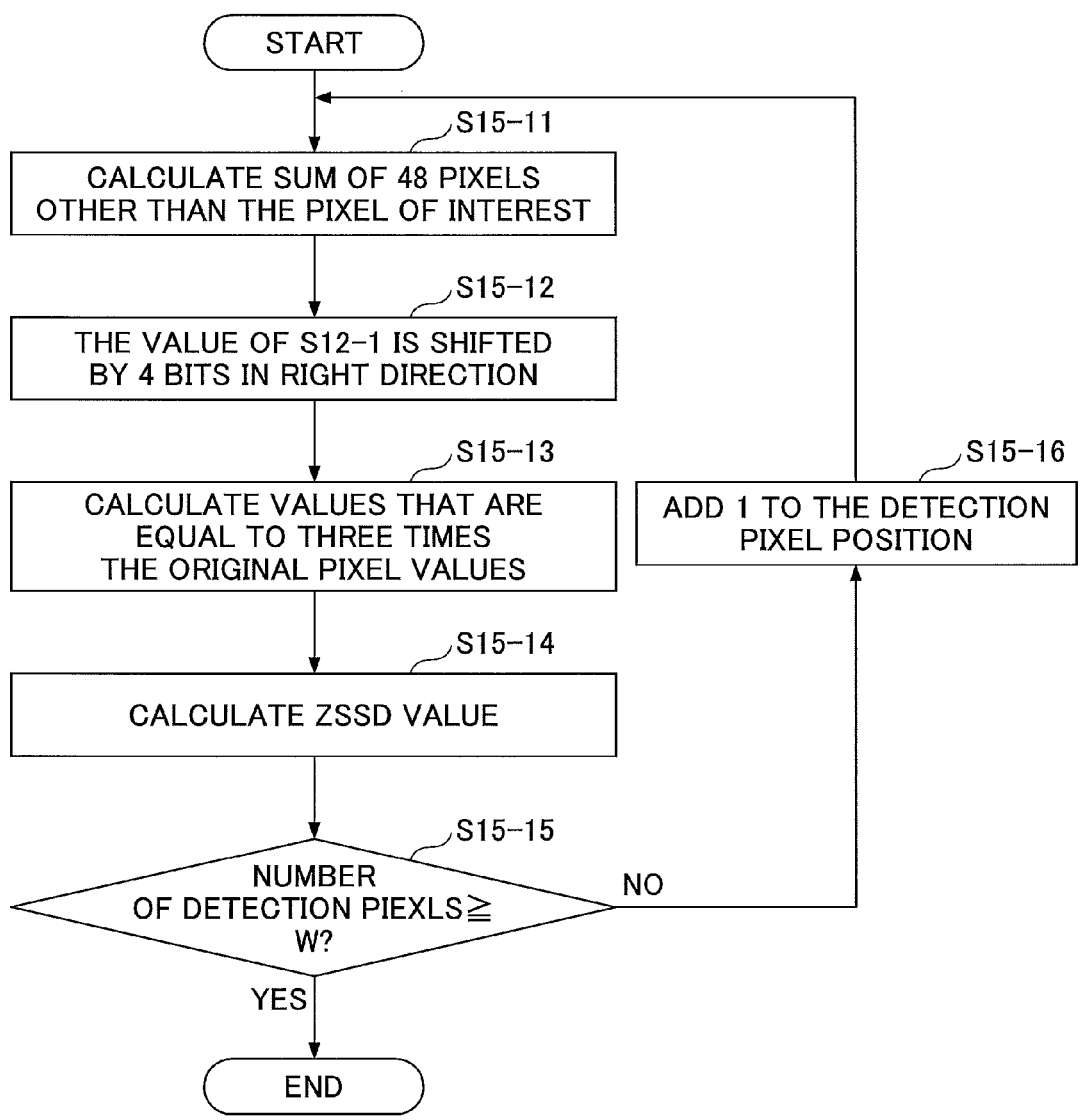
FIG. 11 is a flowchart illustrating an example of a detailed process of step S15-1 of FIG. 8.
Figure 12:
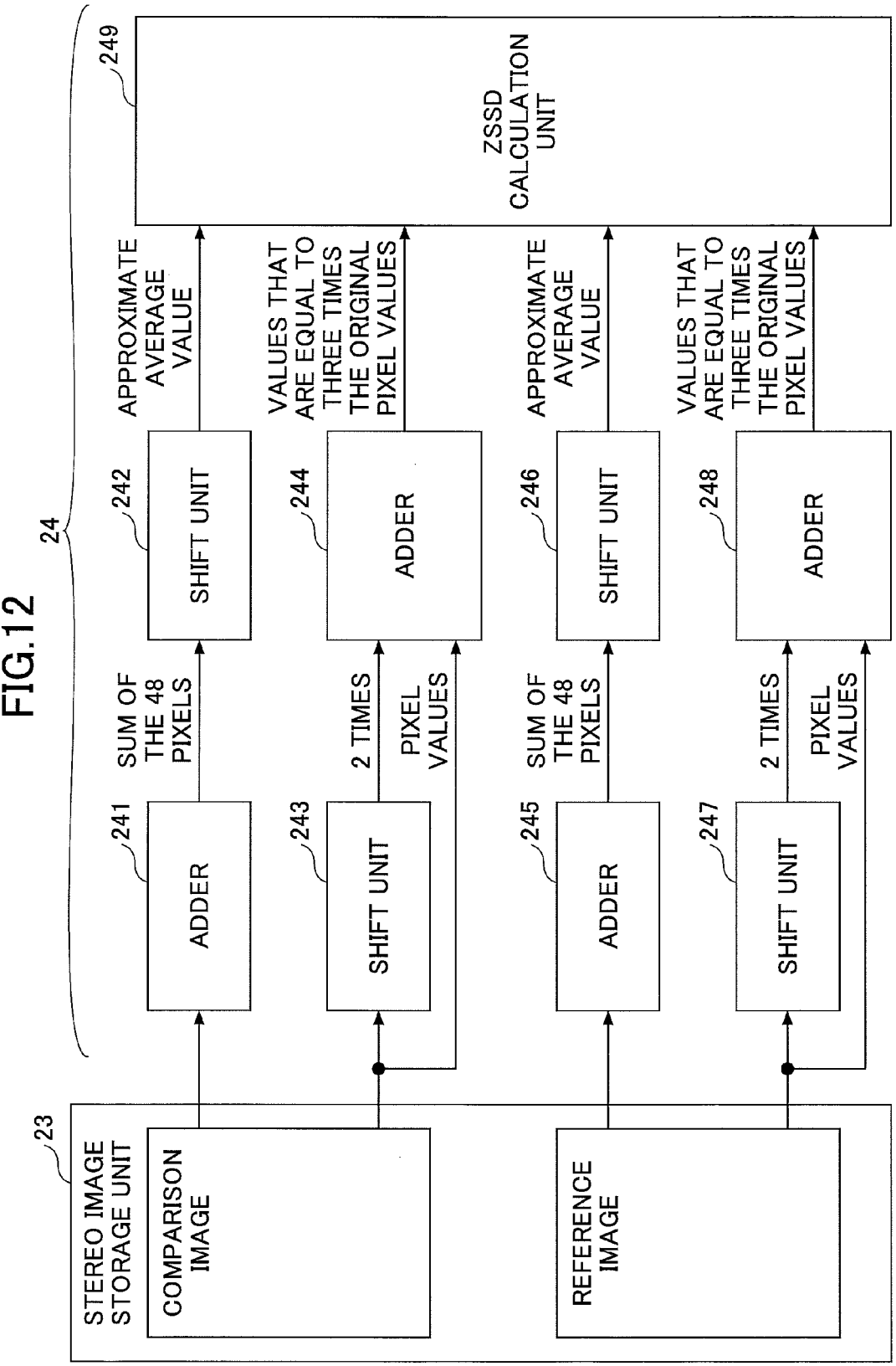
FIG. 12 is a diagram schematically illustrating an example of a circuit configuration of a stereo processing unit.

Subsequently, the method of calculating the disparity d in units of pixels at step S15-1 is explained in detail. FIG. 11 is a flowchart illustrating an example of a detailed process of step S15-1 of FIG. 8. FIG. 12 is a diagram schematically illustrating an example of a circuit configuration of the stereo processing unit 24. An adder 241 adds pixel values of 48 pixels that are included in the detection block of the comparison image, and a shift unit 242 shifts the result of the addition by 4 bits in the right direction. A shift unit 243 shifts each of the pixel values of the 48 pixels that are included in the detection block of the comparison image by 1 bit in the left direction, and an adder 244 adds the pixel value that is shifted by 1 bit in the left direction and the original pixel value. The same calculations are applied to the detection block that is included in the reference image. A ZSSD calculation unit 249 calculates a ZSSD value.

S15-11: The adder 241 calculates a sum of the pixel values of the 48 pixels other than the pixel of interest that are included in the detection block of the comparison image, and the adder 245 calculates a sum of the pixel values of the 48 pixels other than the pixel of interest that are included in the detection block of the reference image. Note that the pixel of interest refers to the center pixel in the detection block. In this embodiment, the pixels of interest are $M_{4,4}$ and $S_{4,4}$.

Each of the adders 241 and 245 may be a circuit that repeats the addition 48 times for each pixel. However, there are many methods of implementing such a circuit, such as a circuit that can calculate the sum of the pixel values of the 48 pixels by a single operation, or a circuit that can calculate a sum of pixel values of m pixels among the 48 pixels by a single operation, and that can repeat the operation 48/m times. In general, as the number of pixels that can be added per single operation becomes greater, the calculation becomes faster, but the circuit scale becomes larger. Thus, the adders 241 and 245 can be designed by considering constraints on the circuit scale and the required calculation speed.

S15-2: Subsequently, the shift unit 242 shifts the result of the addition, which is obtained by adding the pixel values of the 48 pixels by the adder 241, by 4 bits in the right direction. The shift unit 246 shifts the result of the addition, which is obtained by adding the pixel values of the 48 pixels by the adder 245, by 4 bits in the right direction. These are arithmetic shifts. For the upper four digits, four zeros are padded (which means that the value is a positive value), and the lower four digits are discarded. Shifting the value by 4 bits in the right direction is equivalent to dividing the value by 16. In order to obtain a mean value of the pixel values of the 48 pixels, it suffices that the sum of the pixel values of the 48 pixels is divided by 48. However, such a shift operation can only achieve division by a power of two. Therefore, in the embodiment, the division of the sum by 16 is achieved by shifting the sum by 4 bits in the right direction, and the value that is obtained by multiplying the average value of the pixel values of the 48 pixels other than the pixel of interest by three is used as an approximate average value.

The approximate average value
=the value that is obtained by shifting the sum of the pixel values of the 48 pixels by 4 bits in the right direction
=the average value of the pixel values of the 48 pixels×3.

S15-13: The shift unit 243 and the adder 244 calculate values that can be obtained by multiplying the pixel values of the 48 pixels that are included in the detection block of the comparison image by three. The shift unit 247 and the adder 248 calculate values that can be obtained by multiplying the pixel values of the 48 pixels that are included in the detection block of the reference image by three. Namely, the shift unit 243 shifts a pixel value of each pixel of the comparison image by 1 bit in the left direction, and the shift unit 247 shifts a pixel value of each pixel of the reference image by 1 bit in the left direction. While retaining the value of zero, which means that the pixel value is a positive value, for the most significant bit, the lower bits other than the most significant bit are shifted by 1 bit in the left direction, and zero is padded to the least significant bit. By doing this, values are obtained that are equal to twice the original pixel values, respectively.

The shift unit 243 inputs values that are obtained by multiplying the pixel values of the comparison image by two to the adder 244, and the adder 244 adds the values that are obtained by multiplying the pixel values by two to the corresponding pixel values of the comparison image. Similarly, the shift unit 247 inputs values that are obtained by multiplying the pixel values of the reference image by two to the adder 248, and the adder 248 adds the values that are obtained by multiplying the pixel values by two to the corresponding pixel values of the reference image. By doing these, values are obtained that are equal to three times the original pixel values of the comparison image, respectively, and values are obtained that are equal to three times the original pixel values of the reference image, respectively.

S15-14: The ZSSD calculation unit 249 calculates a value that is equivalent to three times the ZSSD value by using the formula that is described below. Hereinafter, this value is simply referred to as a "ZSSD value."

$$3 \times \text{the ZSSD value} = \Sigma\{(3 \times Sij - \text{the approximate average value}) - (3 \times Mji - \text{the approximate average value})\}^2$$

Namely, for the comparison image, the ZSSD calculation unit 249 subtracts, for each pixel, the approximate average value from the value that is obtained by multiplying the pixel value by three. For the reference image, the ZSSD calculation unit 249 subtracts, for each pixel, the approximate average value from the value that is obtained by multiplying the pixel value by three. Then, the ZSSD calculation unit 249 squares a value that is obtained by subtracting the subtracted value of the reference image (i.e., (3×Mji−the approximate average value)) from the subtracted value of the comparison image (i.e., (3×Sij−the approximate average value)). After that, the ZSSD calculation unit 249 adds all the 48 squared values that are obtained by the above-described calculations. By such calculations, the ZSSD value can be obtained as a correlation value without executing division processing.

S15-15: The stereo processing unit 24 determines whether the number of the detection pixels is greater than or equal to the detection width W.

S15-16: When the number of the detection pixels is less than the detection width W, the stereo processing unit 24 increments the number of the detection pixels by one (that is, the pixel of interest is shifted by one pixel in the horizontal direction), and the process from S15-11 to S15-14 is repeated until the number of the detection pixels becomes the detection width W. Therefore, the correlation values are obtained, and the number of the obtained correlation values is equal to the detection width W. The shift amount for which the smallest ZSSD value among the obtained correlation values is obtained is the disparity "dint" in units of pixels.

<<Calculation of the Disparity d for the Second Time>>

Figure 13:
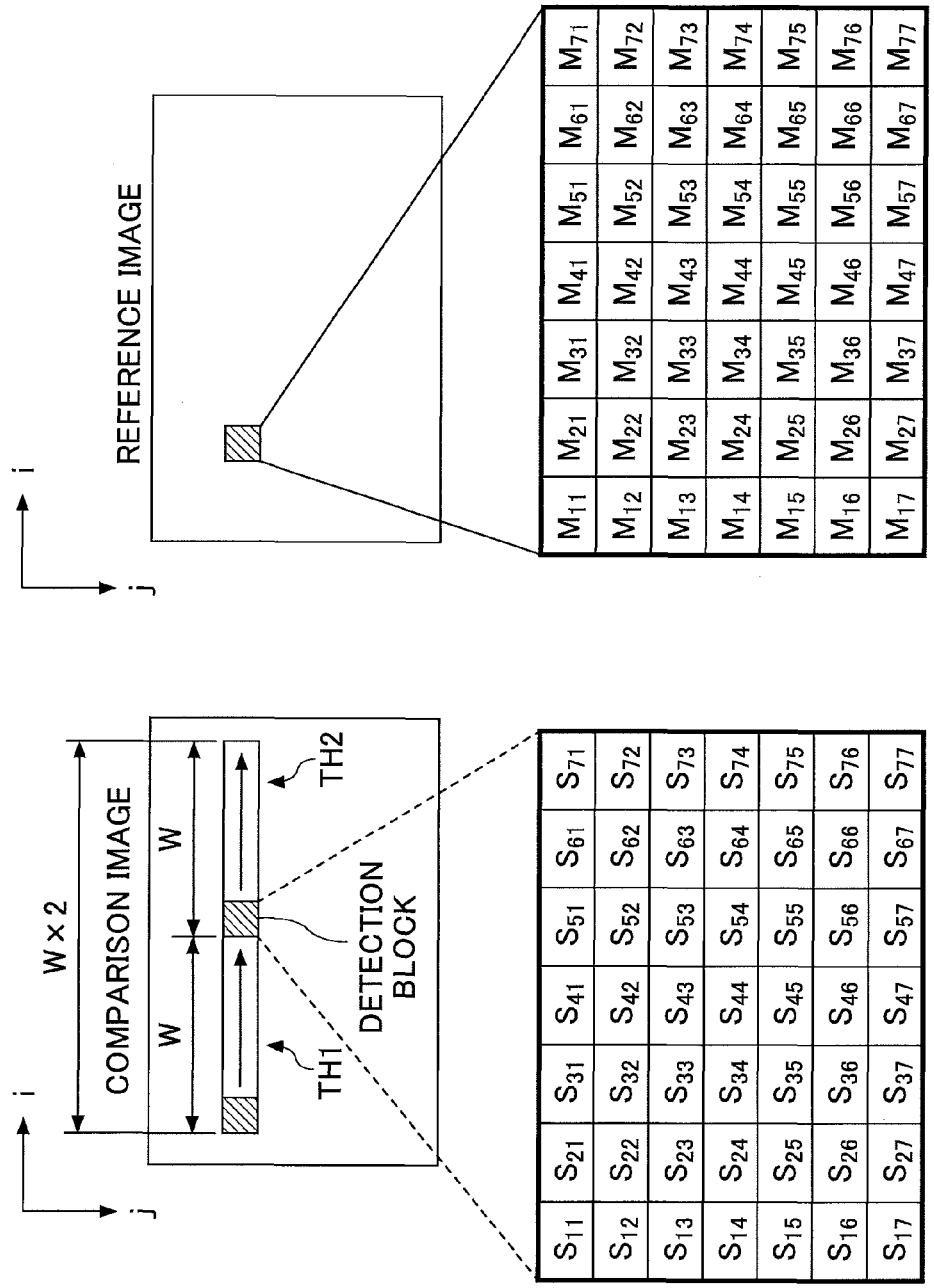
FIG. 13 is a diagram illustrating an example of the block matching for calculating the disparity d for a second time.

FIG. 13 is a diagram illustrating an example of the block matching for calculating the disparity d for the second time. The size of the detection block and the shift amount are the same as those of the first time. However, in the block matching for the second time, the detection range is the second detection range TH2. The second detection range TH2 is a range with the detection width W that starts from a pixel next to the pixel that is located at a position obtained by adding the detection width W to the position of the pixel of interest.

The reference image and the comparison image are already stored in the stereo image storage unit 23. For calculation of the disparity d for the second time, the reference image and the comparison image that are read out again from the stereo image storage unit 23 are used.

For the calculation of the disparity d for the second time, the stereo processing unit 24 starts calculating correlation values from the 32nd pixel because the starting point (e.g., 32) of the second detection range TH2 is set in the parameter register 2403. The method of calculating the correlation values is the same as that of the first time.

The stereo processing unit 24 calculates the disparity d in the second detection range TH2 by shifting the position of the detection block of the comparison image by one pixel each time. The stereo processing unit 24 determines, as the disparity "dint" in units of pixels, the shift amount for which the best correlation value is obtained. Then, the stereo processing unit 24 calculates the disparity "dsub" in units of sub-pixels, and after that, the stereo processing unit 24 calculate the disparity d. Then, the stereo processing unit 24 stores the calculated disparity d in the disparity data storage unit 2.

<The Integration Process of Step S18>

Subsequently, integration of two disparities "d"s is explained. The integration of the disparities "d"s is executed by utilizing reliability that is obtained along with the calculation of the correlation values.

The reliability calculation unit 2401 can calculate reliability for determining whether the correlation values that are used for the determination of the disparity d are reliable.

Figure 14A:
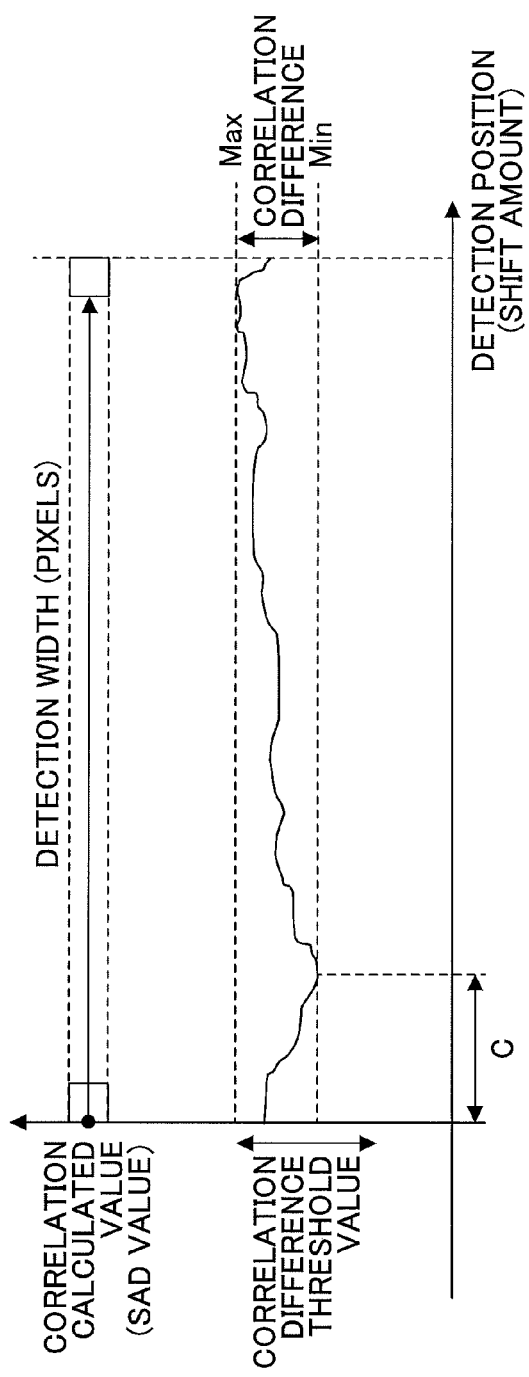
FIGS. 14A and 14B are diagrams illustrating reliability of the disparity d.
Figure 14B:
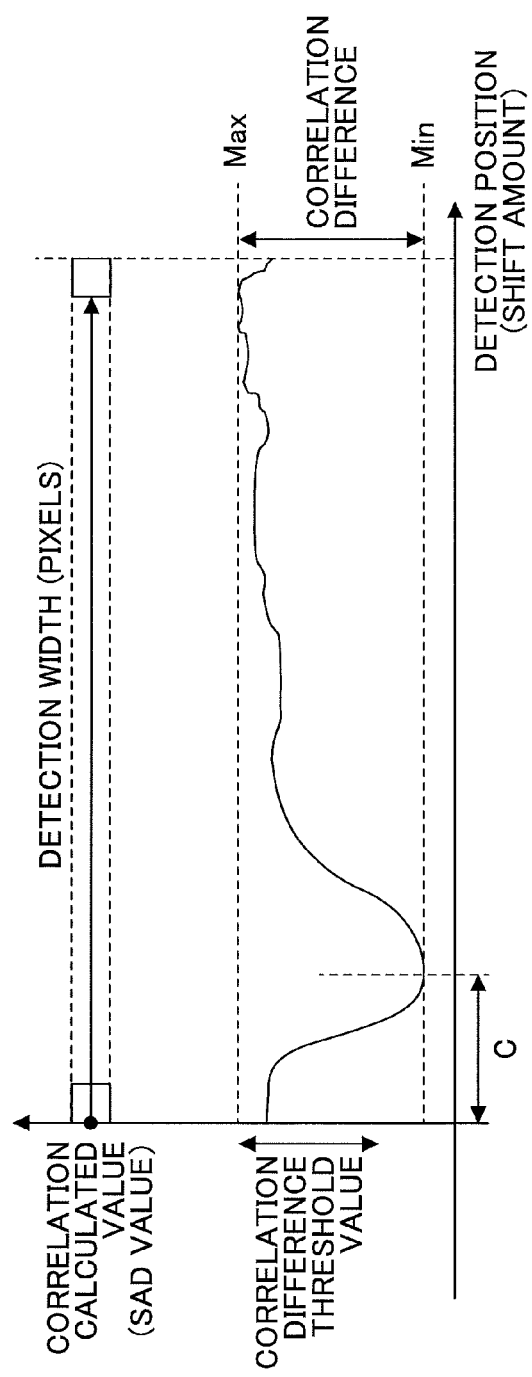

FIGS. 14A and 14B are diagrams illustrating reliability of the disparity d. In FIGS. 14A and 14B, the horizontal axis indicates a detection position (a shift amount), and the vertical axis indicates a calculated correlation value (such as a SSD value, a SAD value, or a ZSSD value, but in FIGS. 14A and 14B, SAD values are used). It can be assumed that, when the disparity d is calculated correctly, the correlation value gently decreases as approaching to the disparity d, and the correlation value takes the minimum value at the disparity d.

In contrast, when all the correlation values within the detection width are similar, it is likely that the determined disparity d is incorrect. When a block of the reference image and a block of the comparison image are flat areas, the correlation value may not vary significantly, even if the shift amount is varied. In such a case, the above-described situation may occur. Thus, the reliability can be determined based on a difference (which is referred to as a "correlation difference," hereinafter) between the minimum value of the correlation values (Min) and the maximum value of the correlation values (Max).

In FIGS. 14A and 14B, when the shift amount is C, the correlation value becomes the minimum. However, there is a significant difference between the correlation difference in FIG. 14A and the correlation difference in FIG. 14B. The reliability calculation unit 2401 detects this difference by using a correlation difference threshold value, and the reliability calculation unit 2401 provides each of the disparities "d"s with reliability. In FIG. 14A, the correlation difference is less than the correlation difference threshold value. However, in FIG. 14B, the correlation difference is greater than the correlation difference threshold value.

Thus, the reliability calculation unit 2401 provides the disparity of FIG. 14B with high reliability (e.g., 1), and the reliability calculation unit 2410 provides the disparity of FIG. 14A with low reliability (e.g., 0).

The reliability can be expressed by more than two values, instead of the two values of 1 and 0. For example, when two bits are used for indicating the reliability, the reliability can be determined (expressed) by one of the four values. In order to express the reliability by more than two values, for example, it is possible to take out correlation values of some points in the vicinity of the shift amount for which the correlation becomes the best, and determine whether these correlation values increase and/or decrease depending on the shift amount. By combining the result of this determination and the result of the determination by the correlation difference threshold value, the reliability can be determined to be one of the four values;

when the correlation difference is large, and the correlation value decreases and increases depending on the shift amount, the reliability is 3;

when the correlation difference is large, and the correlation value decreases or increases depending on the shift amount, the reliability is 2;

when the correlation difference is small, and the correlation value decreases and increases depending on the shift amount, the reliability is 1; and when the correlation difference is small, and the correlation value decreases or increases, the reliability is 0.

The disparity integration unit 33 determines the ultimate disparity d depending on the reliability of the disparity d that is stored in the disparity storage unit 1 and the reliability of the disparity d that is stored in the disparity storage unit 2 as follows:

(i) When the reliability of the disparity d that is stored in the disparity storage unit 1 and the reliability of the disparity d that is stored in the disparity storage unit 2 are different, the disparity d having the higher reliability is selected among the disparity d that is stored in the disparity storage unit 1 and the disparity d that is stored in the disparity storage unit 2 (i.e., the most reliable disparity is selected).

(ii) When both the reliability of the disparity d that is stored in the disparity storage unit 1 and the reliability of the disparity d that is stored in the disparity storage unit 2 are high (i.e., the reliability is 1), the disparity d that is stored in the disparity storage unit 2 is selected. By doing this, the disparity d becomes large, so that closer distance information can be obtained.

(iii) When both the reliability of the disparity d that is stored in the disparity storage unit 1 and the reliability of the disparity d that is stored in the disparity storage unit 2 are low (i.e., the reliability is 0), it is determined that the disparity is not obtained.

By the above-described process, a state is obtained such that, for each pixel, one disparity d is stored in the integrated disparity data storage unit 26.

<The Number of Times of the Calculation and a Frame Interval>

FIGS. 15A and 15B are timing charts of an example of calculation of the disparity d. FIG. 15A is a timing chart according to related art that is shown for comparison. FIG. 15B is a timing chart for the case where the number of times of calculation is two.

As shown in FIG. 15A, the reference image and the comparison image are input to the image processing IC 20 from the left camera 13L and the right camera 13R in synchronization with a frame synchronization signal FV. The stereo processing unit 24 calculates the disparity d by executing the detection process within the first detection range TH1, and the stereo processing unit 24 stores the calculated disparity d in the disparity data storage unit 1. According to the related art, this process is repeated each time a reference image and a comparison image are input.

According to this embodiment, as shown in FIG. 15B, the detection within the first detection range TH1 is the same as that of the related art. However, after completing the detection within the first detection range TH1, the stereo processing unit 24 executes the detection process within the second detection range TH2, calculates the disparity d, and stores the calculated disparity d in the disparity data storage unit 2, prior to the input of the next reference image and comparison image.

Thus, it is possible to calculate the disparity d multiple times to the extent that the time interval of the frame synchronization signal allows. For example, assuming that the time interval of the frame synchronization signal is T seconds, and that the time period that is required for calculating the disparity d once is t seconds, the image processing IC 20 can calculate the disparity d for N times, where N=T/t+Q (Q is the reminder).

The calculation count setting unit 32 sets the thus obtained number of times of the calculation, N times, in the calculation count register 2402. When the number of times of the calculation N is a fixed value, the number of times of the calculation N may be set, in advance, in the calculation count setting unit 32.

<<Dynamic Changing of the Number of Times of the Calculation>>

The number of times of the calculation can be dynamically changed within the range of the maximum number of times of the calculation N. For example, during driving of the vehicle, the number of times of the calculation of the disparity d can be dynamically changed. During high-speed driving, in many cases, calculation of the distance between the vehicle and a distant obstacle is desired because the TTC with the distant obstacle is shortened. In contrast, when the vehicle is stopped or is moving at low speed, in many cases, calculation of the distance between the vehicle and an obstacle in the vicinity of the vehicle is desired. That is because it is possible that a pedestrian in the vicinity of the vehicle dashes out.

Figure 16:
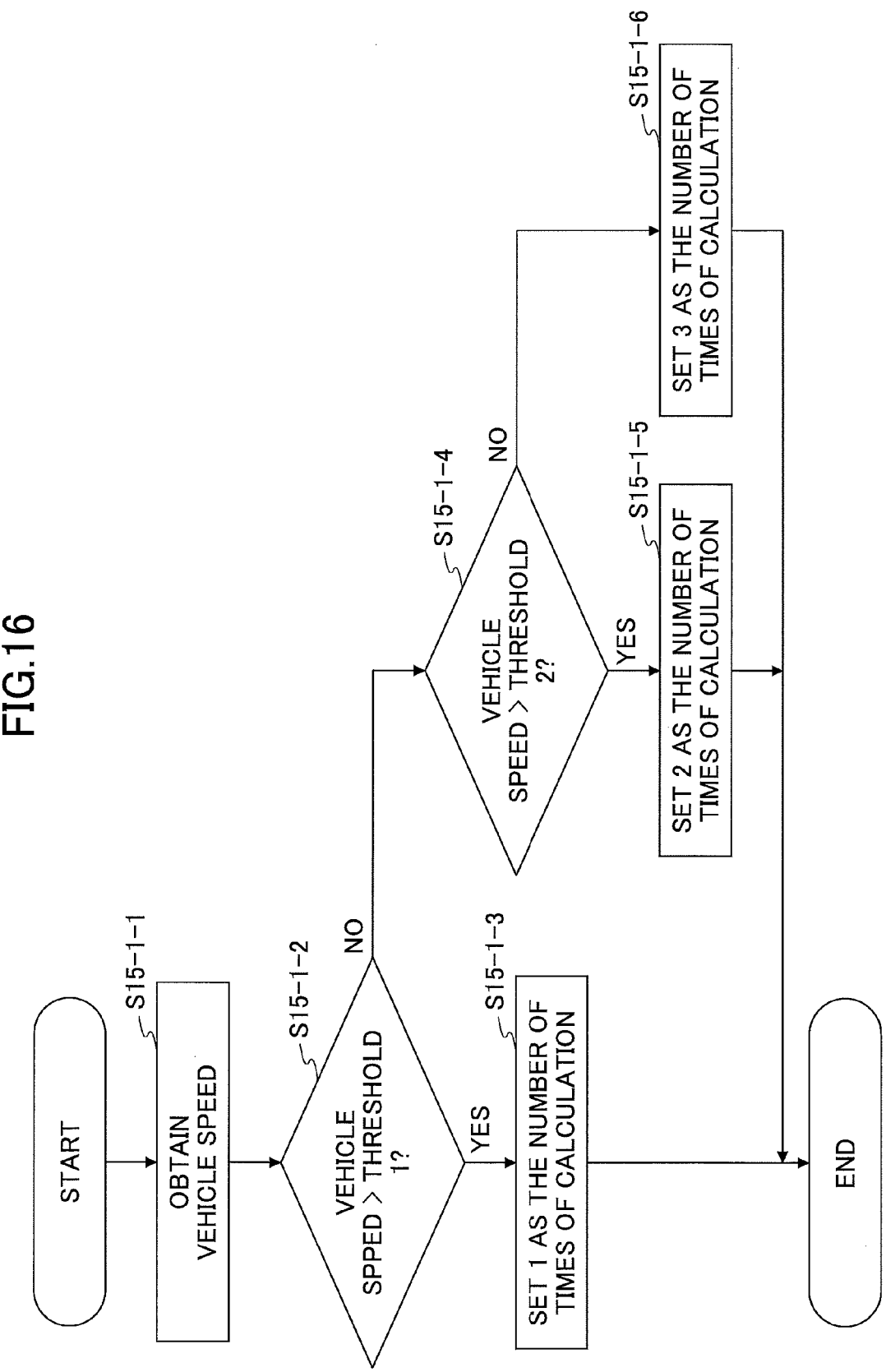
FIG. 16 is a flowchart illustrating an example of a procedure for a calculation count setting unit to set a number of times of calculation depending on vehicle speed.

FIG. 16 is a flowchart illustrating an example of a procedure for the calculation count setting unit 32 to set the number of times of calculation depending on vehicle speed.

The calculation count setting unit 32 periodically obtains the vehicle speed (S15-1-1).

The calculation count setting unit 32 compares the vehicle speed with a threshold value 1 (S15-1-2). When the vehicle speed is greater than the threshold value 1 (i.e., Yes at the determination of step S15-1-2), the calculation count setting unit 32 sets one as the number of times of the calculation (S15-1-3).

When the vehicle speed is less than or equal to the threshold value 1 (i.e., No at the determination of step S15-1-2), the calculation count setting unit 32 compares the vehicle speed with a threshold value 2 (S15-4-1). It is assumed that the threshold value 1 is greater than the threshold value 2.

When the vehicle speed is greater than the threshold value 2 (i.e., Yes at the determination of step S15-1-4), the calculation count setting unit 32 sets two as the number of times of the calculation (S15-1-5).

When the vehicle speed is less than or equal to the threshold value 2 (i.e., No at the determination of S15-1-4), the calculation count setting unit 32 sets three as the number of times of the calculation (S15-1-6).

In this manner, as the vehicle speed becomes lower, the number of times of the calculation is increased. Accordingly, when the vehicle speed is high, the detection is executed only within the first detection range TH1, so that the power consumption can be reduced. When the vehicle speed is low, the distance information of an obstacle in the vicinity of the vehicle can be more accurately calculated. The setting of the number of times of the calculation can be made together with the initialization of the variable k at step S11 of FIG. 8, for example.

In many cases the time interval of the frame synchronization signal FV is fixed for the stereo camera 13. However, if it is possible to change the time interval of the frame synchronization signal FV for the stereo camera 13, the time interval can be changed depending on the number of times of the calculation. In this manner, as the number of times of the calculation becomes smaller, the time interval of the frame synchronization signal FV can be shortened, and the calculation interval of the disparity d can be shortened.

<<Detection Only within the Second Detection Range TH2>>

The stereo processing unit 24 may execute the detection process only within the second detection range TH2, without including the first detection range TH1 in the detection width. For example, a case can be considered in which the vehicle approaches to a wall and parks. Depending on the vehicle, the vehicle may execute prevention control for preventing sudden start of the vehicle that can be caused by erroneous operation of a shift lever by a driver.

In this case, distance information of a distant obstacle may not be detected. Thus, detection within the first detection range TH1 becomes less necessary. Thus, when the vehicle is stopped, and when the disparity d can be calculated only within the second detection range TH2, the detection range can be limited to the second detection range TH2.

Figure 17:
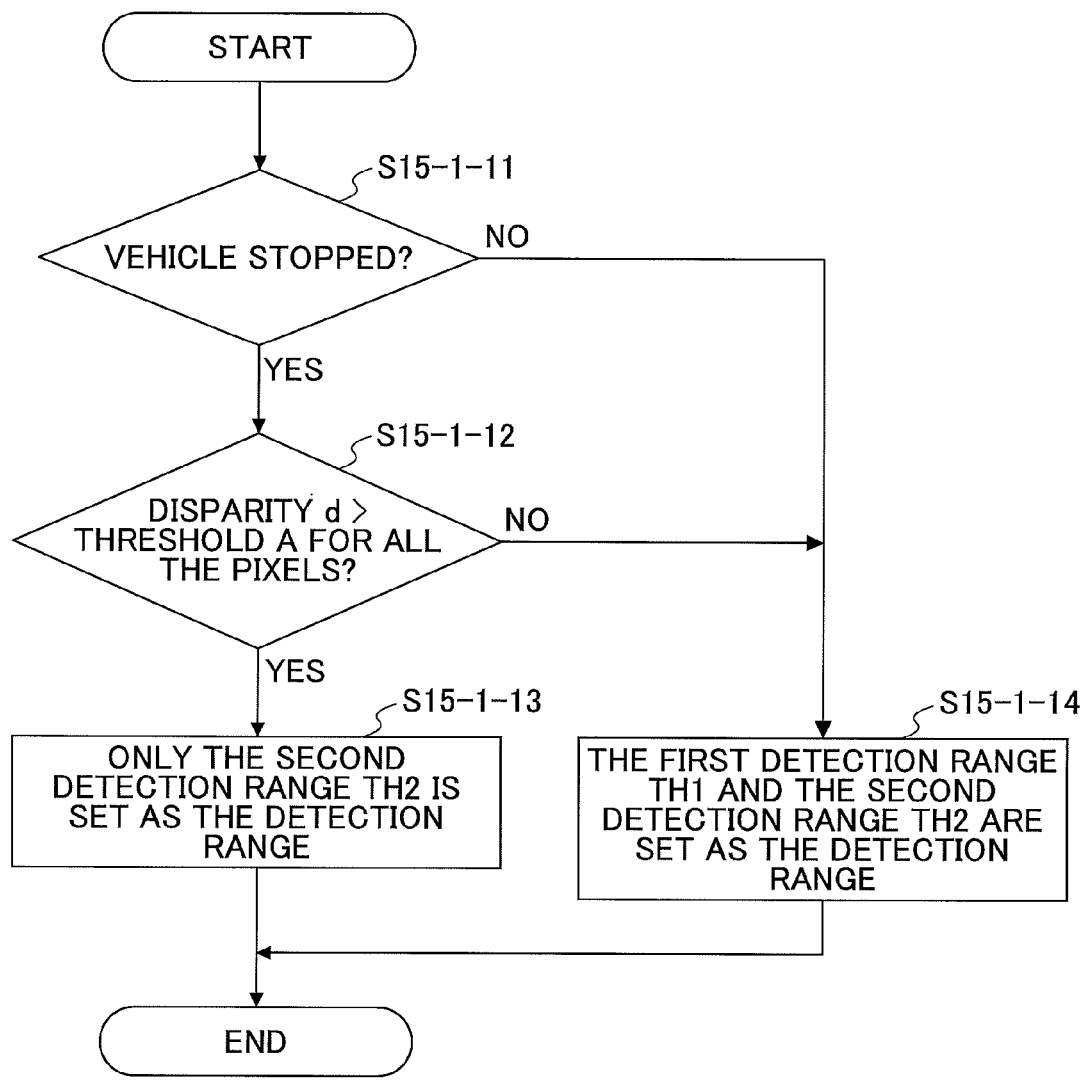
FIG. 17 is a flowchart illustrating an example of a procedure for a detection range setting unit to set a detection range.

FIG. 17 is a flowchart illustrating an example of a procedure for the detection range setting unit 31 to set a detection range.

The detection range setting unit 31 periodically obtains vehicle speed, and the detection range setting unit 31 determines whether the vehicle is stopped (S15-1-11). When the vehicle is stopped, it is less likely that a condition around the vehicle is changed. Thus, even if the detection range is limited to a short range, a harmful situation may not occur. That is the reason why only the case is considered in which the vehicle is stopped.

When a determination is made that the vehicle is stopped (i.e., Yes at the determination of step S15-1-11), the detection range setting unit 31 determines whether the disparities "d"s for all the pixels are greater than a threshold value A (S15-1-12). Here, all the pixels may be all the pixels for which the disparities "d"s are detected.

When a determination is made that the disparities "d"s for all the pixels are greater than the threshold value A (i.e., Yes at the determination of step S15-1-12), the detection range setting unit 31 sets only the second detection range TH2 as the detection range (S15-1-13). Specifically, the detection range setting unit 31 sets W (e.g., 32) in the parameter register 2403 as a fixed value that cannot be updated by the stereo processor 24.

When a determination is not made that the disparities "d"s for all the pixels are greater than the threshold value A (i.e., No at the determination of step S15-1-12), the detection range setting unit 31 sets the first detection range TH1 and the second detection range TH2 as the detection range (S15-1-14).

With such control, for example, in the prevention control for preventing sudden start of the vehicle that can be caused by erroneous operation of a shift lever by a driver, the image processing IC 20 can execute the detection process only within a relevant detection range.

The present invention can be implemented in any convenient form, for example using dedicated hardware, or a mixture of dedicated hardware and software. The present invention may be implemented as computer software implemented by one or more network processing apparatuses. The network can comprise any conventional terrestrial or wireless communications network, such as the Internet. The processing apparatuses can comprise any suitable programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, a magnetic tape device or a solid state memory device. The hardware platform includes any desired hardware resources including, for example, a central processing unit (CPU), a random access memory (RAM), and a hard disk drive (HDD). The CPU may be implemented by any desired type of any desired number of processor. The RAM may be implemented by any desired type of volatile or non-volatile memory. The HDD may be implemented by any desired type of non-volatile memory capable of storing a large amount of data. The hardware resources may additionally include an input device, an output device, or a network device, depending on the type of the apparatus. Alternatively, the HDD may be provided outside the apparatus as long as the HDD is accessible. In this example, the CPU, such as a cache memory of the CPU, and the RAM may function as a physical memory or a primary memory of the apparatus, while the HDD may function as a secondary memory of the apparatus.

APPLICATION EXAMPLE

The image processing device, the image processing method, the non-transitory computer readable storage medium storing a program, the disparity data producing method, and the device control system are explained above by the embodiment. However, the present invention is not limited to the above-described embodiment, and various variations and modifications may be made without departing from the scope of the claims.

In the embodiment, the example is explained in which the image processing IC 20 is mounted on the vehicle. However, the image processing IC can be mounted on a robot, for example. For example, when the robot is moving, the movement can be assisted by obtaining a distance between the robot and a distant obstacle. For example, when the robot is to analyze an object that is grasped by the hand, the analysis of the shape of the object can be facilitated by obtaining distance information in the vicinity of the robot.

The present application is based on and claims the benefit of priority of Japanese Priority Application No. 2014-118706 filed on Jun. 9, 2014, the entire contents of which are hereby incorporated herein by reference.

What is claimed is:

1. An image processing device configured to generate disparity information from a first image and a second image, wherein the first image is captured by a first capture unit and the second image is captured by a second capture unit, the image processing device comprising:
a disparity detector configured to detect a first disparity information of a specific pixel or a specific pixel block of the second image by correlating the specific pixel or the specific pixel block of the second image with each of pixels or each of pixel blocks of a first detection range having a predetermined detection width in the first image,
wherein the disparity detector is configured to detect second disparity information of the specific pixel or the specific pixel block of the second image more than once by specifying a start point of a second detection range having the predetermined detection width in the first image, the second detection range being different from the first detection range, and correlating the specific pixel or the specific pixel block of the second image with each of pixels or each of pixel blocks of the second detection range that has the predetermined detection width from the start point.

2. The image processing device according to claim 1, wherein the disparity detector is configured to specify a pixel or a pixel block that is next to the pixel or the pixel block that is disposed at a tail end of the pixels or the pixel blocks within the first detection range as the starting point of the second detection range.

3. The image processing device according to claim 1, wherein the disparity detector is configured to detect, by specifying the start point, the second disparity information of the specific pixel or the specific pixel block of the second image a maximum number of times that is allowed by a time interval for the first capture unit to capture the first image or a time interval for the second capture unit to capture the second image.

4. The image processing device according to claim 1, further comprising:
a reliability determination unit configured to determine reliability of a plurality of disparity information items of the specific pixel or the specific pixel block of the second image, the plurality of disparity information items being detected by the disparity detector; and
a disparity information determination unit configured to determine a disparity information item that has a highest reliability among the plurality of disparity information items of the specific pixel or the specific pixel block of the second image as the disparity information of the specific pixel or the specific pixel block of the second image.

5. The image processing device according to claim 1, further comprising:
a calculation count register configured to store a number of times of calculation of the first disparity information and the second disparity information,
wherein the disparity detector is configured to continue detecting the second disparity information of the specific pixel or the specific pixel block of the second image by specifying the start point, until a number of times of the detection of the first disparity information and the second disparity information becomes the number of times of the calculation that is stored in the calculation count register.

6. The image processing device according to claim 1, further comprising:
a start point pixel position register configured to store a position of a pixel that is the start point,
wherein the disparity detector is configured to detect the second disparity information of the specific pixel or the specific pixel block of the second image by using the position of the pixel that is stored in the start point pixel position register as the start point of the second detection range.

7. An image processing method for generating disparity information from a first image and a second image, wherein the first image is captured by a first capture unit and the second image is captured by a second capture unit, the method comprising:
a first disparity information detecting step, by a disparity detector, of detecting first disparity information of a specific pixel or a specific pixel block of the second image by correlating the specific pixel or the specific pixel block of the second image with each of pixels or each of pixel blocks of a first detection range having a predetermined detection width in the first image; and
a second disparity information detecting step, by the disparity detector, of detecting second disparity information of the specific pixel or the specific pixel block of the second image by specifying a start point of a second detection range having the predetermined detection width in the first image, the second detection range being different from the first detection range, and correlating the specific pixel or the specific pixel block of the second image with each of pixels or each of pixel blocks of the second detection range that has the predetermined detection width from the start point.

8. A device control system configured to control a device by processing an image that is captured by a capture unit, the system comprising:
a first capture unit configured to capture a first image;
a second capture unit configured to capture a second image;
a disparity detector configured to detect disparity information of a specific pixel or a specific pixel block of the second image by correlating the specific pixel or the specific pixel block of the second image with each of pixels or each of pixel blocks of the first image within a predetermined detection width; and
a device controller configured to control the device based on the disparity information that is detected by the disparity detector,
wherein the disparity detector is configured to detect first disparity information of the specific pixel or the specific pixel block of the second image by correlating the specific pixel or the specific pixel block of the second image with each of pixels or each of pixel blocks of a first detection range having the predetermined detection width in the first image, and wherein the disparity detector is configured to detect second disparity information of the specific pixel or the specific pixel block of the second image more than once by specifying a start point of a second detection range having the predetermined detection width in the first image, the second detection range being different from the first detection range, and correlating the specific pixel or the specific pixel block of the second image with each of pixels or each of pixel blocks of the second detection range that has the predetermined detection width from the start point.

9. The image processing device according to claim 1, wherein the second detection range is adjacent to the first detection range, and the second detection range is for detecting a disparity value at a short distance side compared to the first detection range with respect to the specific pixel or the specific pixel block of the second image.

10. The device control system according to claim 8, wherein the device controlled by the device control system is a vehicle.

* * * * *